United States Patent [19]

Haried

[11] Patent Number: 4,549,362
[45] Date of Patent: Oct. 29, 1985

[54] PROGRAMMABLE AIR RECIRCULATOR/MIXER FOR A FABRIC DRYER

[76] Inventor: John C. Haried, 1616 Kenilworth Pl., Aurora, Ill. 60506

[21] Appl. No.: 565,476

[22] Filed: Dec. 27, 1983

Related U.S. Application Data

[63] Continuation-in-part of Ser. No. 340,746, Jan. 19, 1982.

[51] Int. Cl.[4] .............................................. F26B 21/10
[52] U.S. Cl. ........................................ 34/31; 34/46; 34/47; 34/48
[58] Field of Search ............... 34/15, 46, 47, 48, 54, 34/63, 77, 133, 31

[56] References Cited

U.S. PATENT DOCUMENTS

| | | | |
|---|---|---|---|
| 1,431,145 | 10/1922 | Bolling | 34/47 |
| 3,398,461 | 8/1968 | Janke | 34/53 |
| 3,526,968 | 9/1970 | Triplett | 34/48 |
| 4,076,492 | 2/1978 | Alms et al. | 34/174 |
| 4,268,247 | 5/1981 | Freze | 34/15 |

FOREIGN PATENT DOCUMENTS 309385 11/1918 Fed. Rep. of Germany ......... 34/47

Primary Examiner—Larry I. Schwartz
Attorney, Agent, or Firm—Willian Brinks Olds Hofer Gilson & Lione Ltd.

[57] ABSTRACT

An air recirculator/mixer system for easy adaptation to a conventional dryer system. A programmable control unit operates according to a predetermined program scheme, in response to elapse time and temperature sensor inputs to drive a motive means and adjust fresh air and exhaust dampers of the recirculator/mixer system. Damper adjustments are made during a drying cycle in response to the accrued time and temperature data processed by the controller.

35 Claims, 11 Drawing Figures

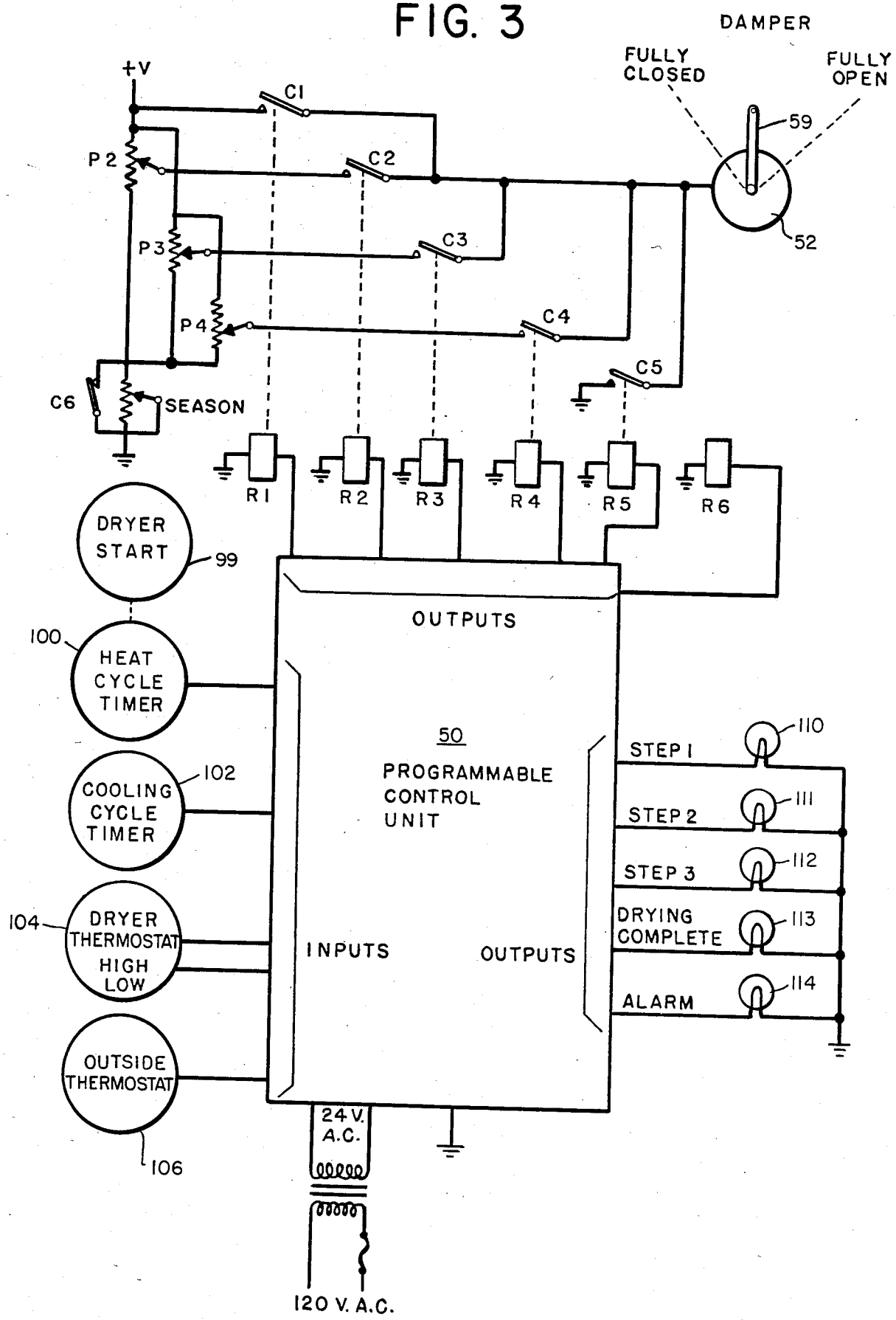

PROGRAMMABLE AIR RECIRCULATOR/MIXER FOR A FABRIC DRYER

This is a continuation-in-part of Haried application Ser. No. 340,746 filed Jan. 19, 1982.

BACKGROUND OF THE INVENTION

The present invention generally relates to forced air dryers of the batch type, and more particularly to methods and apparatus for controlling air recirculation during the drying cycle to optimize the fuel efficiency of such dryers.

It is a well known technique in commercial fabric dryers to elevate the temperature of the moisture-laden air removed from the drying chamber and recirculate it back into the chamber. U.S. Pat. No. 4,268,247 titled "Method for Drying Fabrics" discusses such a method wherein the reuse of a given amount of moisture-laden hot air, mixed with a predetermined amount of fresh air, results in a reduction of fuel consumption as compared to a system which only heats fresh air for introduction into the drying chamber.

It is discussed in the noted patent, as well as in my U.S. Pat. No. 4,267,643, that the temperature of hot air removed from the drying chamber may be used as an indication of the progress of the drying cycle to control the dryer heater.

While the drying systems known in the art achieve an efficiency of operation by recirculating a predetermined portion of the air removed from the drying chamber, the drawback of such systems is that during the early part of the drying cycle the humidity of the air removed from the chamber is high, and thus the reuse of such air reduces the effectiveness of the dryer to further evaporate moisture from the fabrics. On the other hand, in the latter part of the drying cycle, the air removed contains less evaporated moisture and thus a higher percentage of the removed air should be reintroduced into the dryer.

In textile dryers it is known that one can measure the humidity of hot air removed from the drying chamber to control the exhaust damper to regulate the amount of hot air which is exhausted from the system.

While the moisture content of the hot air removed from the drying chamber can be measured over the period of the drying cycle, the value thereof changes as a function of a host of variables, such as for example; the temperature and humidity of the fresh air added, the amount and type of fabrics to be dryed and the temperature to which the reused air is heated. It is evident that there is a need to control the amount of hot air reused based upon the moisture content of such air at various periods of time in the drying cycle. The amount of moist hot air exhausted from the drying system should be correspondingly replaced by cooler dry air which is then heated and recirculated. In other words, during the early part of the drying cycle, little hot air should be reused, and large amounts of fresh air should be drawn into the system. As the drying cycle progresses, a correspondingly larger amount of hot air in the dryer should be reused, and less fresh air introduced into the system. It is a corollary to the foregoing that as the amount of dry hot air reused increases, less heat energy needs to be added to the system. It is further evident that the portion of hot, wet air which is exhausted must be replaced within fresh air, prefereably from outdoors in order to obtain air with the lowest possible moisture content.

In order to optimize the efficiency of drying systems parameters, other than air temperatures within the drying system, such as the temperature of the fresh air, should be monitored and used as indications when changes in the drying cycle are necessary. Because of the large numbers of conventional dryers presently in existence, there is a need to provide an adjunct to thereby modernize such systems without extensive modification or reworking of the established system.

SUMMARY OF THE INVENTION

According to the invention there is provided a recirculation and air mixing system which is adapted to be mounted to existing drying systems to take exhaust air from the dryer outlet, to remove from the exhaust air over 99% of the solid contaminants, to measure continuously the temperature of the exhaust air, and variably throughout the drying cycle to discharge portions of the exhaust air and simultaneously replace that portion exhausted with fresh air. The division of exhaust air discharged and exhaust air diverted to be mixed with fresh air is accomplished by a damper which moves through the exhaust air and is automatically positioned at any point between 100% discharge and 100% recirculated. Linked to and operating opposite from the exhaust damper is a fresh air damper. When the exhaust damper is positioned for 100% discharge, the fresh air damper is positioned fully open to admit 100% fresh air. The dampers are adjusted by electrical motive means in response to changes in temperature and time measured by the programmed controller and its sensors.

In one embodiment of the invention a programmed controller has inputs connected to a heat cycle timer, a cooling cycler timer and a temperature thermostat all of which, with the exception of the programmed controller, are a part of the conventional dryer system. An optional outside temperature thermostat is also provided and connected to the programmed controller. The controller executes its program routines according to the electrical input indications and drives the motive means to adjust the exhaust and fresh air dampers during the drying cycle to optimize the reuse of hot air within the drying system in accordance with a predetermined scheme.

In another embodiment of the invention the programmed controller has as inputs a temperature sensor upstream the fresh air vent measuring the process exhaust air temperatures, a temperature sensor downstream such vent measuring mixed air temperatures, and an electrical connection to the blower of the dryer system to determine the elapsed time that the dryer has been activated by an operator. With this arrangement the outside thermostat is eliminated as changes in outside air temperatures are reflected by the output indication of the downstream thermostat. The controller operates according to a variable but predetermined program scheme including a program phase which compares the upstream and downstream temperatures and adjusts the fresh air and exhaust dampers to attain a particular downstream temperature as a ratio of the upstream temperature. During this particular program phase the exhaust and fresh air dampers undergo dynamic adjustments and readjustments to achieve the proper temperature ratio preventing a positive build up of air pressure in the system at the downstream temperature sensor.

BRIEF DESCRIPTION OF THE DRAWINGS

FIG. 3 is a simplified electrical schematic drawing of the air recirculation controller.

DETAILED DESCRIPTION OF THE PREFERRED EMBODIMENT

Figure 1:
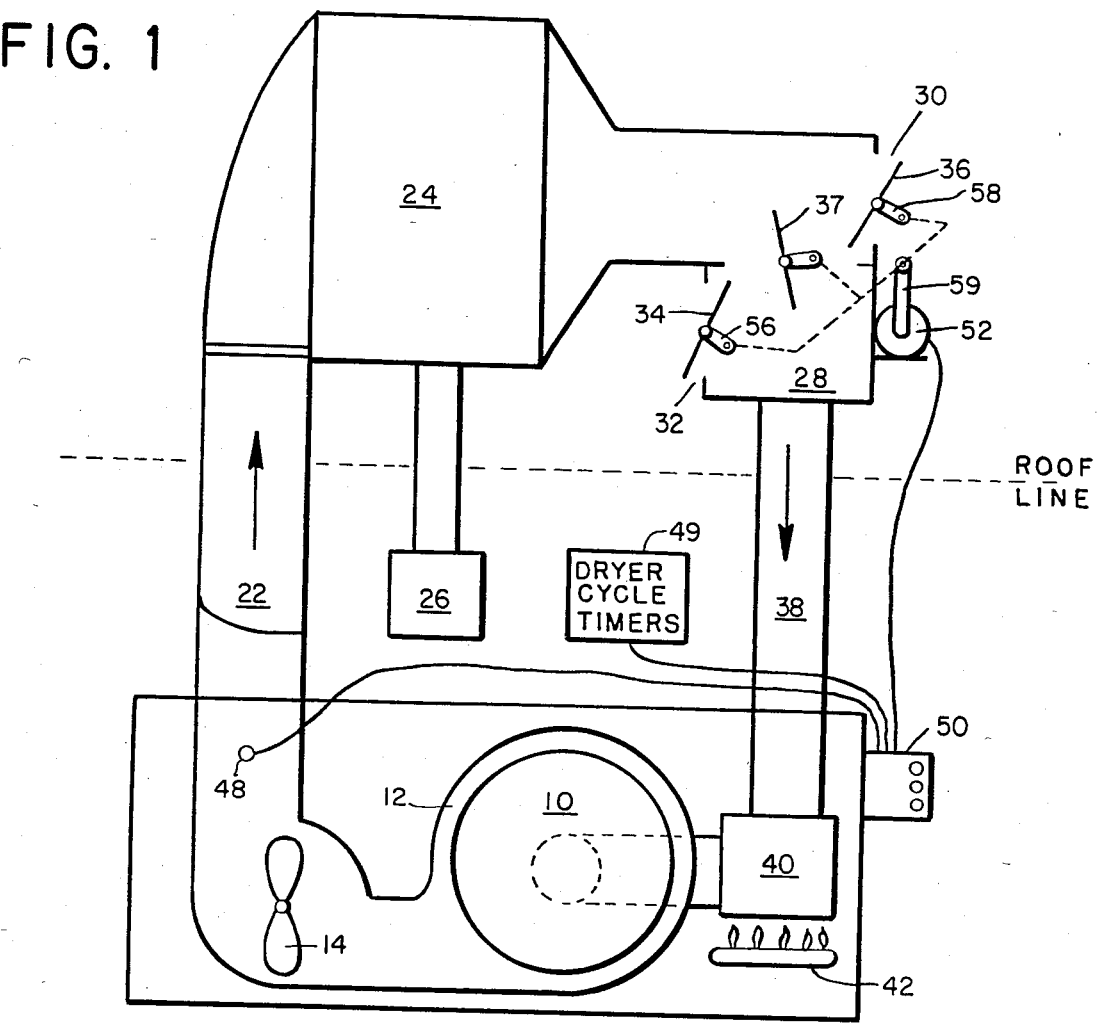
FIG. 1 is a front elevational view of an exemplary dryer adapted for use with one embodiment of the recirculation and mixing system according to the present invention.

FIG. 1 depicts an exemplary commercial dryer adapted for use with a first embodiment according to the present invention. It should be understood that the invention is not limited to use with commercial dryers, nor those that are designed for drying fabrics, but rather the present invention may be used with many types of dryers including the home and commercial types, or dryers intended to use in drying articles other than textiles. The invention is, however, principally directed to a dryer which may be adapted for reusing a portion of the hot air removed from the drying chamber.

At the outset it should also be realized that for the practical operation of a recirculatory type dryer, the air removed from the chamber must be filtered to remove particulate matter such as lint and dust. Inadequate filtering in such a system can frustrate the cleaning process by redepositing lint or dust on the articles which have been cleaned.

Shown specifically in FIG. 1 is a drying chamber 10 which contains articles (not shown), such as laundry, to be dried. The peripheral walls of the chamber may be perforated with holes so that the moisture-laden air can be drawn out of the chamber into a jacket 12 by means of a blower fan 14. The humid air removed from the chamber 10 is forced by the blower 14 through exhaust duct 22 to a filtering system 24. A lint and dust filter suitable for use with the recirculation-type dryer is the two-stage filter obtainable from Energenics. Inc. Aurora, Ill. Another lint disposal unit is fully discussed in U.S. Pat. No. 3,996,441 the subject matter of such patent being incorporated herein by reference thereto. The particulate matter removed by filter 24 is accumulated in a container 26 for subsequent disposal thereof.

From the filtering system 24, the moisture-laden air passes into an air mixer 28 to either be exhausted to the atmosphere through exhaust vent 30, or to be mixed with fresh dry air entrained into the system through fresh air vent 32. The particular mixture of fresh air and filtered hot air is determined by the position of a fresh air damper 34 and an exhaust damper 36. The negative air pressure in the duct system resulting from the blower 14 draws the mixed air out of the mixer 28, into return duct 38, and then into the heater chamber 40 where the temperature of the mixed air is increased. It is a well known thermodynamic fact that air which has been heated is capable of holding a greater amount of water vapor than the equal weight of air could hold prior to being heated.

The source of heat 42 can be a burner fired by an oil or gas fuel or a steam heated coil. In the case of laundry dryers having the capability of handling four hundred pounds of fabric saturated with about 240 pounds of water, the burner should have the capability of raising the temperature in chamber 40 to at least 330 degrees F.

From the heating chamber 40, the heated air enters the drying chamber 10 at the rear central portion thereof so that the hot air can be evenly distributed through the laundry to effect a uniform evaporation of moisture from all surfaces of the fabric.

The foregoing constitutes the basic recirculatory cycle of air within the drying system which utilizes the reuse of hot air to thereby reduce fuel consumption.

In accordance with the invention, there is provided a programmable controller 50 which is responsive to electrical inputs connected to a drying cycle timer 49 and a temperature sensor 48. The programmed controller 50 may also be connected to ancillary sensors, such as an outside temperature sensor, the details of which will be described more thoroughly in connection with FIG. 3. In the preferred embodiment the output of the programmed controller 50 drives a motor 52 which adjusts the exhaust damper 36 and the fresh air damper 34 through lever arm 59 linked to such dampers. Such a controller 50 can be easily adapted to many drying systems with little modification to such system. It will be appreciated that the adaption of the present invention to an existing drying system is easily undertaken as the controller 50 does not control the dryer system timers or heat sources, but rather acts passively to indications thereof to actively control the fresh air damper 34 and the exhaust damper 36. Stated in another way, the drying system operates in the same manner as it did before the addition of the return duct system, the dampers and the controller, but thereafter the air within the system is further conditioned to optimize efficiency.

The logic unit 50 is responsive to indications of changes in the temperature of the air removed from the drying chamber 10 to control the fresh air damper 34, the exhaust damper 36 and the mixer damper 37 to thereby optimize the reuse of hot air within the system. The measurement of changes in temperature of exhaust air has been found to be a direct indicator of the progress of the moisture evaporation occurring within the drying chamber 10. Such a technique is fully disclosed in my U.S. patent as heretofore identified.

Figure 2:
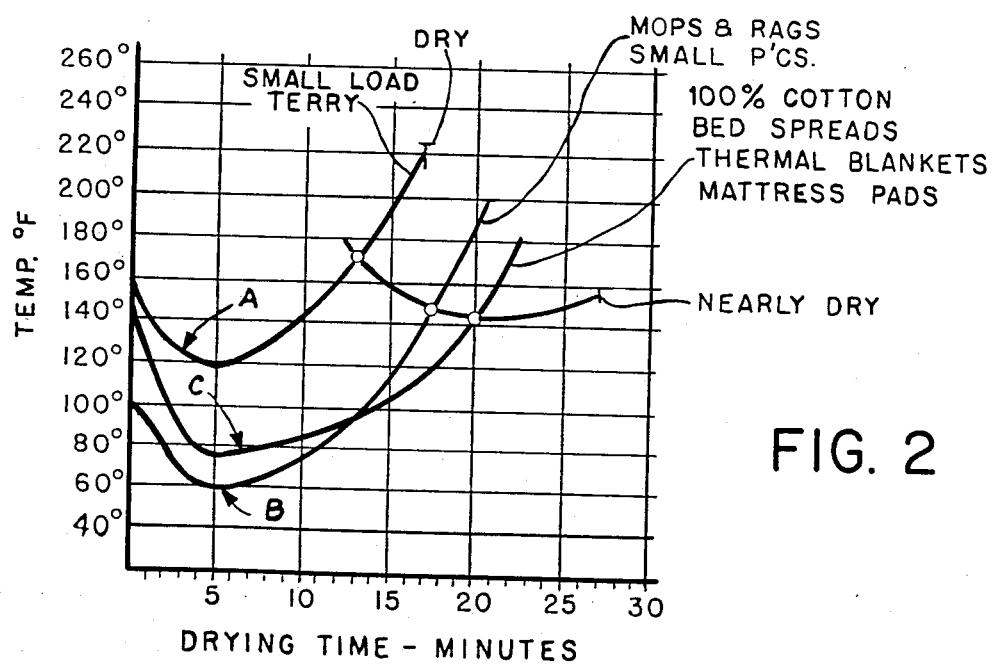
FIG. 2 is a chart of time versus blower exhaust temperature for various drying cycles.

Referring briefly to FIG. 2, there is shown the drying times of various types of laundry loads as a function of the temperature of the air removed from the drying chamber 10. During the portion of the curves which have a negative slope, representative of the early part of the drying cycle, a massive release of moisture from the fabrics reduces the temperature of the exhaust air. A zero temperature slope is an indication that the fabric surface moisture is being vaporized. The remaining moisture, embedded within the seams and windings of the fabrics, while small in relationship to the total moisture, must still be removed. The removal of decreasing amounts of moisture per minute results in a positive-going temperature slope and is a signal that vaporization is decreasing and thus the drying cycle should soon be halted so that overdrying does not occur. Overdrying should be carefully guarded against because it is both wasteful of energy and detrimental to the fabrics. Excessive drying causes more lint to be generated and has the effect of wearing out the fabrics.

The family of curves illustrated in FIG. 2 was obtained through experimentation with various types of laundry loads. Curve A, for example, shows the drying curve for a small load of Terry cloth material. Curves B and C represent respectively the drying curves of mops, rags and small pieces; and heavy loads including 100% cotton bedspreads, thermal blankets and matress pads. Empirical experimentation with other types of loads or objects to be dryed may be conducted to derive temperature gradient data useful in forming a determination of when a particular type of load is dry.

In the preferred embodiment of the present invention a conventional silicon transistor is employed as a sensor of temperature. Such a device is relatively inexpensive and is operative to sense temperature changes over the entire range of temperatures occurring within the drying cycle. Of course, a humidity sensor could be utilized to measure the moisture content of the air removed from the drying chamber, however, such equipment is expensive, complicated, has not yet proven to be reliable and is less sensitive to changes in humidity at the higher air temperatures. The term "drying cycle" as used herein is meant to generally include a heat cycle as well as a subsequently occurring cooling cycle.

With reference again to FIG. 1, it is seen that fresh air and exhaust dampers 34 and 36 are linked together by a mechanism (shown by dotted lines) which is coupled to the servo motor lever arm 59. These linkage arms of the mechanism are fastened to their respective dampers in such a manner that an angular displacement of lever 59 is operative to open or close both dampers 34 and 36 together by the same amount. Therefore, when it is desired to exhaust, for example, 20% of the filtered air, and draw into the system 20% fresh air, the dampers are adjusted by a signal from the control unit 50 which energizes the motor 50 to open (or close) exhaust and fresh air dampers 34 and 36 to the extend that 20% of the system air is exhausted and 20% fresh air is entrained into the system by way of the fresh air vent 32. In some dryer applications it may be advantageous to have the fresh air damper open more than the exhaust damper, or vice versa.

Mixing chamber damper 37 is also coupled to the servo motor lever arm 59 in such a manner that its angular movement opposes that of dampers 34 and 36. Suffice it to say that the damper linkages are levered and connected so that when the dampers 34 and 36 are, for instance, 20% open, mixer dampers 37 is 80% open. The reused hot air is thus partially directed from the exhaust vent 30 and passes by mixer damper 37 to be mixed with the fresh air before being reheated. Other arrangements are, of course, possible for adjusting the dampers to control the conditioning of air within the dryer system. Damper control motor 52 is a servo type motor which rotates a specified number of degrees for a particular magnitude of input DC voltage. For example, with an input DC range of 0-10 volts, the rotor of the motor would have zero angular displacement for zero input volts, 180 degrees angular displacement for 5 volts, and 360 degrees angular displacement for 10 volts. Such servo motor devices are well known in the art and need not be further delineated here.

Heat Recirculation Operation

Referring now to FIG. 3 of the drawings, there is shown the programmable control unit, generally designated 50, which is responsive to dryer cycle timers comprising a heat cycle timer 100, a cooling cycle timer 102, and a dryer thermostat 104 as well as an outside temperature thermostat 106. As noted before, the control unit 50, according to the present invention, requires minimal modification of the drying system for implementing its purpose. Particularly, the control unit 50 does not directly control, and thus need not be connected to the dryer burner. The control unit 50 does, however, have adequate input and output connections to accommodate the monitoring or controlling of optional equipment.

The programmable control unit 50 which will be frequently referred to below, is preferably a Texas Instruments model 510 programmable control integrated circuit. It should be understood by those skilled in the art that a variety of integrated circuitry can be used to function as programmable control unit 50. The control unit 50 sequentially executes its stored program to respond to the input stimuli and operate a number of output relays R1 [insert missing material] closes contact C1 to thereby apply +V volts to the servo motor 52. The operation of relays R2-R5 comparably close contacts C2 through C5 and apply respective voltage magnitudes to the servo motor 52. The function of R6 will be discussed later. It should be noted that the closure of each contact C1 through C5 applies a respective voltage which decreases in magnitude, and thus decreases the angular displacement of the servo motor arm 59. In this manner the exhaust damper 6, and thus the fresh air damper 34, can be adjusted from their fully open positions to their fully closed positions.

The closure of relay contact C1, being connected directly to the +V voltage source, causes the two noted dampers to become fully opened. The potentiometers P2-P4, associated with their respective relay contacts effect the adjustment of the dampers to a desired position intermediate the fully open and fully closed positions. Relay contact C5, being connected to circuit ground (zero volts), causes zero angular displacement of the servo motor arm 59 and thus closes the exhaust and fresh air dampers 34 and 36. The adjustment of the potentiometer labeled "Season" changes the voltage at the wiper arms of all potentiometers P2-P4. This has the effect of changing all three intermediate damper positions with the adjustment of only the one potentiometer "Season". This aspect of the invention is useful in adjusting the amount of fresh air drawn into the system in accordance with the daily or seasonal changes in atmosphere temperatures. For example, during the summer when the ambient temperature of the air is high, the dampers should be adjusted to allow more outside hot air to be introduced into the system to thereby reduce the amount of fuel consumed to heat the air.

Indicator lamps 110-112 are optional equipment, but are useful in displaying the progress of the programmable control unit 50 in executing the steps of its program. Lamp 113 indicates the completion of a drying cycle. Lamp 114 can be illuminated when, for instance, the temperature of the drying chamber rises to a dangerous level.

It is important to understand that conventional drying systems are equipped with heating and cooling cycle timers, and temperature thermostats. A typical thermostat, indicated by reference numeral 104, has two inputs to the programmable control unit 50, one for indicating when a first temperature has been reached within the heating chamber 40, and another when a second temperature has been reached.

In order not to necessarily encumber this disclosure, each software instruction will not be discussed, but rather there will be described a general flowchart of the functions carried out by the programmable control unit 50 in optimizing the efficiency of the drying system. It should be realized that a person skilled in the software programming art, along with a detailed programming instruction booklet available with the noted integrated circuit, can readily develop a program to carry out the function as next described.

Figure 4A:
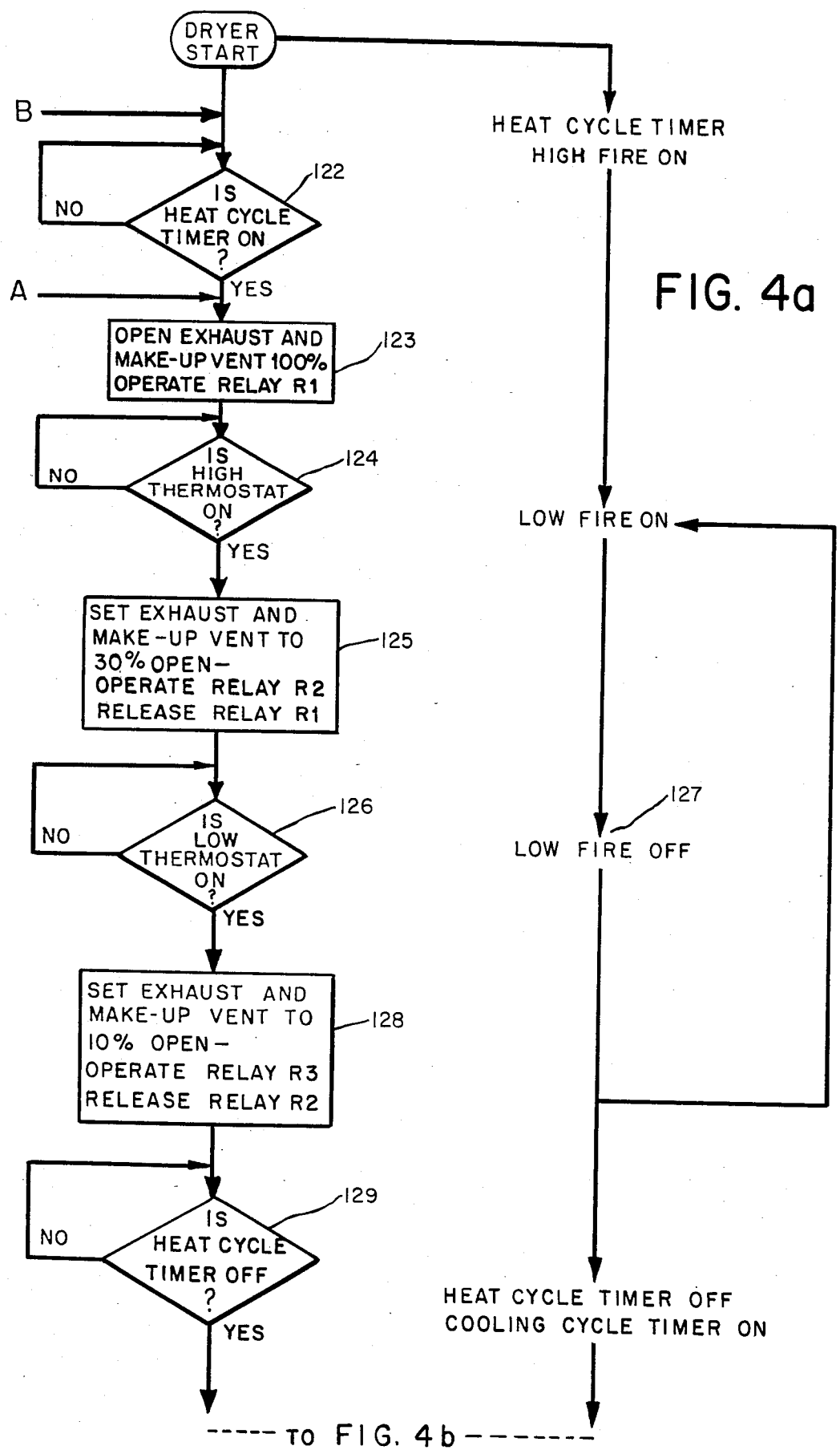
FIGS. 4a-4b, when placed end to end, form a program flowchart illustrating the operational steps of the programmed controller during a drying cycle.
Figure 4B:
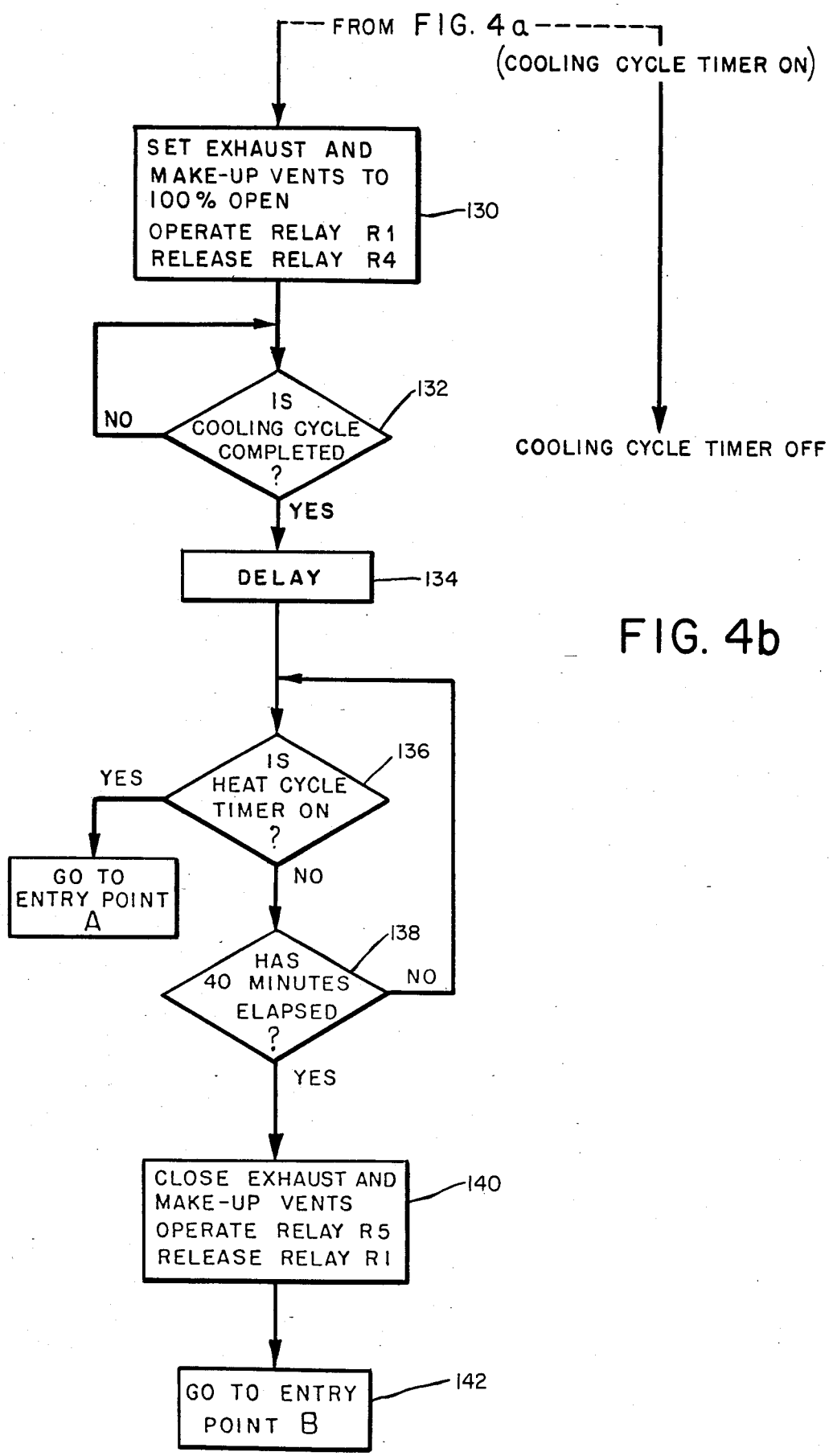

FIG. 4a and FIG. 4b, when laid end to end, illustrate how the programmable control unit 50 responds to the various input stimuli to operate the various relays and thereby adjust the dampers. The functions on the left-hand part of the Figures represent control unit operations, and the actions on the right-hand part of the Figures represent the dryer heating and cooling cycle timers whose operations are not controlled by the programmable control unit. The initiation of a drying cycle is commenced by pushing a dryer start button 99, in which event the dryer heat cycle timer 100 starts. The timer causes the burner 40 high fire to start so that the dryer air can quickly be brought up to operating temperature. Initially, the programmable control unit 50 begins in a software loop 122 waiting for the start of the heat cycle by an indication of an electrical signal on the heat cycle time 100 input to the control unit 50. On an affirmative indication of the start of heat cycle, the control unit 50 executes a series of instructions which causes the operation of relay R1 and fully opens the exhaust 36 and fresh air dampers 34, as heretofore described. This portion of the drying cycle occurs only for a brief time as determined by the control unit 50, so that the system can be purged of stale or gaseous air. The purging of system air occurs irrespective of the temperature of the air within the system.

After the operations in functional block 123 have been performed, the control unit 50 proceeds to software loop 124 to await an input indication of a high temperature level on dryer thermostat input 50. While the control unit 50 is in loop 124 the drying is vaporizing the major portion of surface water from the laundry. At this time 100 percent of the moisture-laden air removed from the drying chamber 10 is exhausted through exhaust vent 30. The temperature of the air removed from the drying chamber 10 is also rising to about 170 degrees F. When this temperature is reached the dryer thermostat 104 high temperature contact closes and causes two reactions. The first reaction is that the dryer burner 42 switches to a low fire, and second, the control unit 50 recognizes the contact closure signal and proceeds to functional step 125 of its program.

During the dryer cycle when the low fire is on, the majority of the moisture has been evaporated from the fabric and thus the temperature of the air removed from the drying chamber 10 increases. Again, this is the phenomena as taught in my issued patent as hereinbefore noted. In executing the control unit program to perform the operations of functional block 125, the control unit output produces an output signal which operates relay R2, and removes the output signal thereby releasing relay R1. Potentiometer P2 has been preadjusted so that the servo motor 52 opens the exhaust and fresh air dampers 30%. This adjustment allows the system to take advantage of the hot air removed from the drying chamber and recirculate it. This is consistent with the drying cycle since the hot air removed from the drying chamber 10 can be reused in increasing proportions as the cycle progresses. Therefore, it will be seen that as the drying cycle proceeds, the fresh air damper 34 will be closed more and more so that less fresh air is introduced into the system and more hot air is reused.

Once the set point of the dryer thermostat 104 has been reached, as indicated at 127, the low fire is routinely switched off by the dryer. The heat cycle timer 100, yet on, allows the low fire to be cycled on and off to maintain a desired temperature in the drying chamber of about 190-210 degrees F. This low fire cycling continues, and is under control of the thermostat 104. Concomitant with the on and off low fire cycle, the programmable control unit 50 is within loop 126 waiting for the first indication of the dryer thermostat low contact closure. Thus, on the first indication that the dryer thermostat has switched the burner low fire to off, an electrical indication thereof is input to and recognized by the control unit whereupon it proceeds to program step 128. At this step in the drying cycle, the control unit 50 operates relay R3 and releases relay R2 to adjust the exhaust and fresh air dampers to 10% open. Thus, more hot air is reused by the system. The dryer system continues to cycle the low fire off and on to maintain a desired drying chamber temperature, and the control unit 50 continues to execute loop 129 until the heat cycle timer 100 has timed out. The time period of the heat cycle time 100 is manually set on the dryer by an operator, and is a function of the type of materials being dryed.

The heat cycle timer 100 and the cooling cycle timer 102 act together so that the cooling cycle timer commences timing once the heat cycle timer times out. The electrical indication of the start of a cooling cycle is input to the control unit 50 and, as shown in FIG. 4b, the control unit 50 proceeds to execute program step 130. During this phase of the cooling cycle, the control unit 50 operates relay R1 and releases relay R4. The purpose of this operation is to fully open the fresh air damper 34 so that fresh air can be brought into the system to remove the heat from the hot laundry load so that it can be manually removed from the drying chamber. The cooling cycle lasts for a specified period of time and is also not under control of the programmable control unit 50. The control unit 50 continues in loop 132 until signaled by the time-out of the cooling cycle timer 102. Upon the occurrence of this event, the control unit 50 proceeds to loop 132. At this point in the drying cycle, and not indicated by the flowchart, the programmable control unit 50 could enter a program routine to illuminate lamp 113 and indicate that the drying cycle is complete. Other program routines could be embedded within the sequence of operations so that within certain phases of the drying cycle lamps 110-112 could be illuminated to indicate the operation of such phase.

After the dryer system has completed its cooling cycle it can either be reloaded to dry another load of laundry, or it may remain idle for a while. After a delay period 134 generated by the control unit 50, the unit proceeds to loop 136 where it senses the heat cycle timer 100 input. An indication that the heat cycle timer 100 is on means that another laundry load has been loaded into the dryer and the start button 99 has been pushed. In this event the control unit 50 is instructed to return to program entry point A as shown in FIG. 4a where it again perfroms the same operations starting with program step 123 as before discussed.

If, after the delay period 134 the heat cycle timer has not yet become activated, control unit 50 proceeds to program loop 138 which invokes an internal 40 minute delay timer. The control unit cycles through steps 136 and 138 for 40 minutes if the heat cycle timer 100 remains unactivated. After 40 minutes, and if another drying cycle has not been started, the programmable control unit 50 proceeds to functional block 140 where relay R5 is operated and relay R1 is released. The operation of relay R5 closes contact C5 and applies zero DC volts to the servo motor 52. This DC input causes the servo motor to completely close the exhaust and fresh air dampers 34 and 36 so that the outside air does not enter the drying system, and thus the building. This aspect is especially advantageous in the winter and prevents the unnecessary waste of energy in preheating the dryer to the operating temperatures.

After the execution of the operational steps in functional block 140, the control unit 50 proceeds to functional block 142 which contains an instruction directing the control unit 50 to go to program entry point B located at the top of FIG. 4a.

Figure 5:
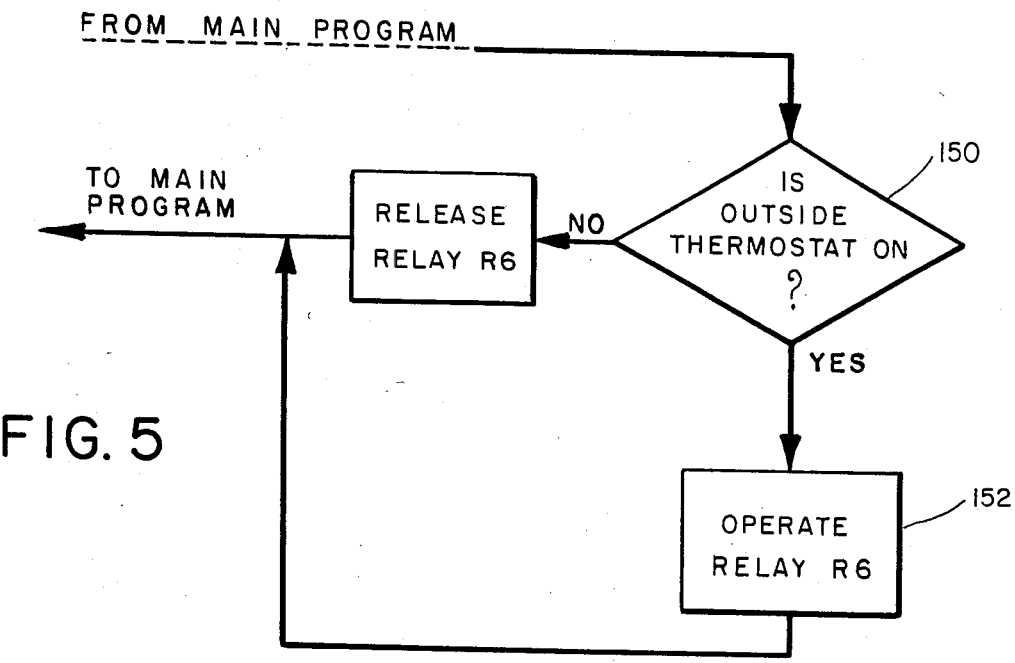
FIG. 5 is a flowchart illustrating a program subroutine executed by the programmed controller to change the damper settings in response to changes in the temperature of the atmosphere.

FIG. 5 illustrates a portion of the control unit program which may constitute a routine for responding to changes in the outside air temperature. In accordance with one feature of the invention, and as briefly alluded to before, the programmable control unit 50 is responsive to increased environmental temperatures by opening the fresh air damper 34 more than it otherwise would be. The additional hot air drawn into the system by the negative pressure coefficient further reduces the burden of the burner 42 to elevate the temperature of the air passing through the heat chamber 40.

The operation of relay R6 opens the normally closed contact C6 thereby inserting the potentiometer "Season" into the voltage divider circuit. As noted previously the adjustment of potentiometer "Season" automatically changes in a slight amount the voltages carried through contacts C2, C3 and C4. The inclusion of the "Season" potentiometer raises the voltage coupled by these three contacts and thereby opens the dampers somewhat more. Experience has shown that it is advantageous to make automatic additional damper adjustments when the outside temperature rises above 40-50 degrees F. To that end, the potentiometer "Season" is adjusted such that the exhaust 36 and fresh air 34 dampers open about 15 percent more than they otherwise would.

FIG. 5 illustrates the manner in which the programmable control unit 50 responds to this outside temperature indication. While the list of program sequences noted in FIG. 5 may be within the main program, they may also be programmed as a subroutine which is periodically referred to by the control unit 50, for instance once a day. The processor branches from the main program and encounters decision block 150 and queries whether the outside thermostat 106 is in an on state. If it is not, an attempt to release relay R6 is made even if it has not previously been operated. The processor then returns to the main program. If the outside thermostat 106 is found to be on, the programmable control unit 50 operates R6 (functional block 152) which inserts the "Season" potentiometer resistance into the voltage divider circuit so that when contacts C2 or C3 or C4 are closed, the dampers open about 15% more than they otherwise would. After the operation of relay R6, the control unit 50 returns to the main program.

Alternative Embodiment of the Invention

Figure 6:
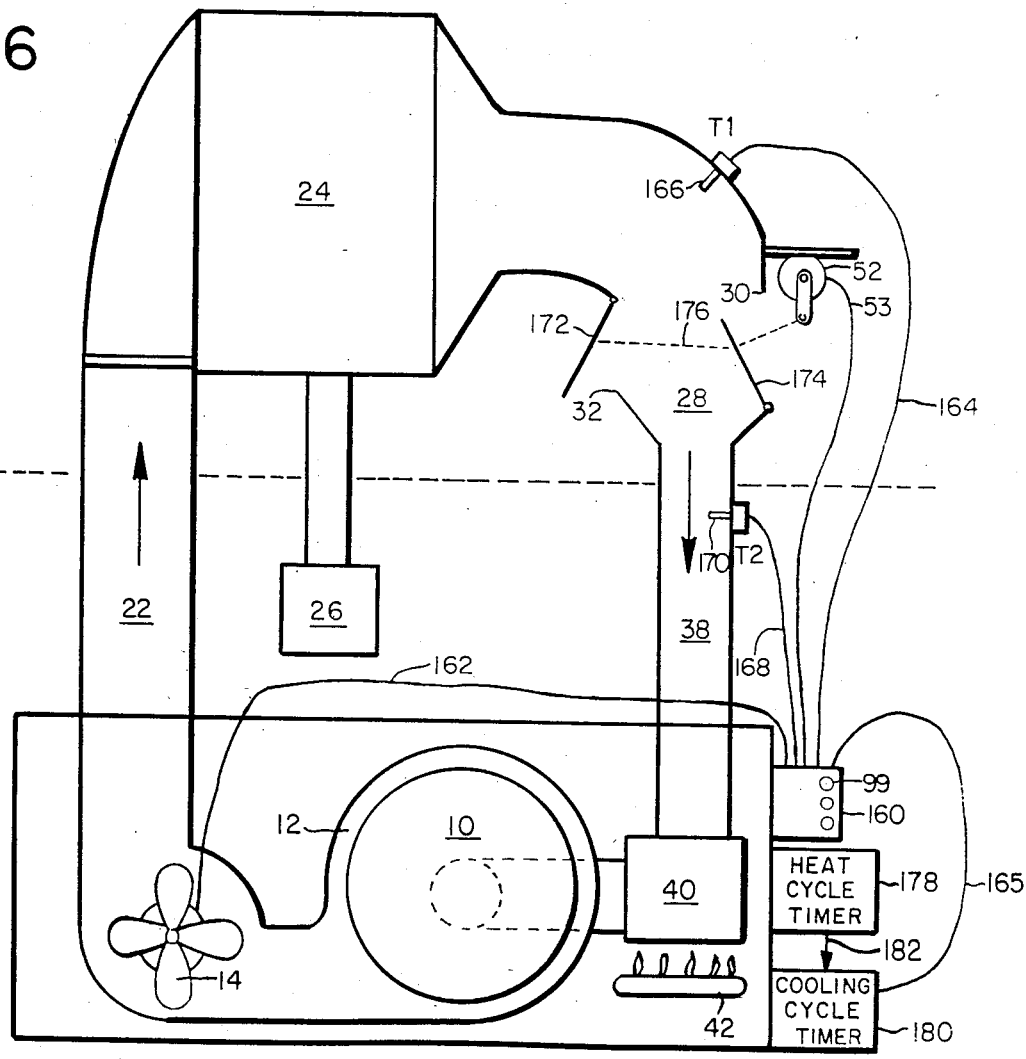
FIG. 6 is a front elevational view of an exemplary dryer adapted for use with a second embodiment of the recirculation system.
Figure 7:
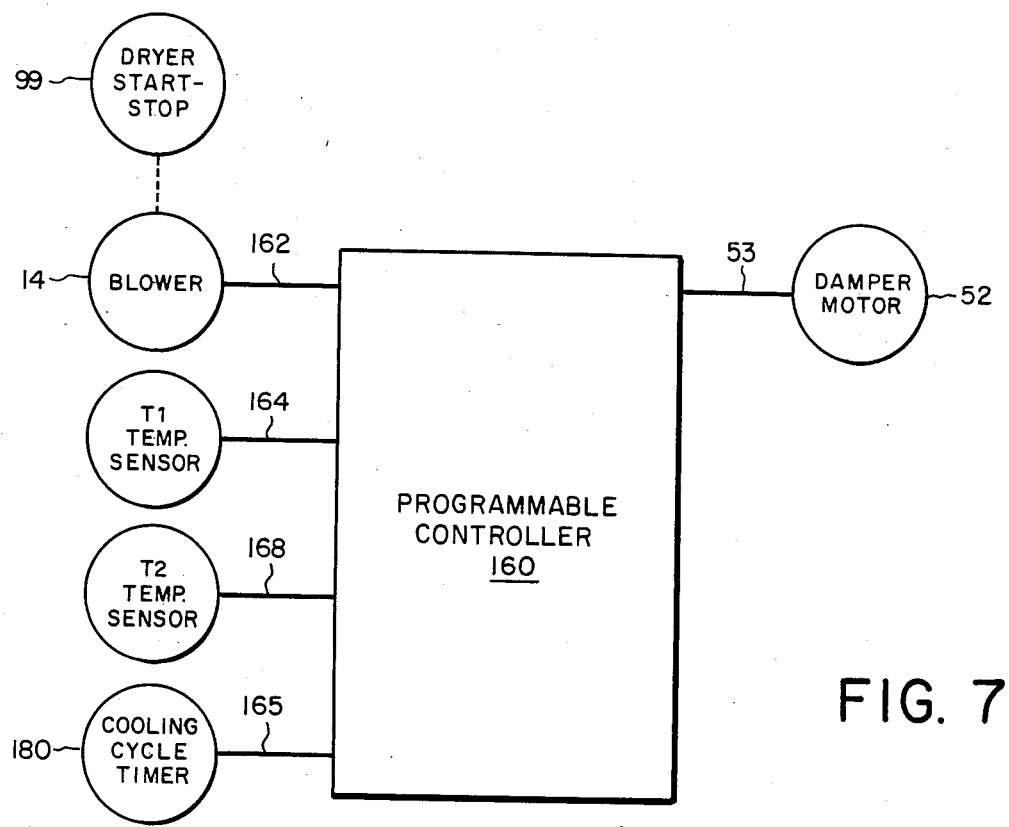
FIG. 7 is a simplified electrical schematic of the second embodiment showing the input and output connections of the programmed controller.
Figure 8:
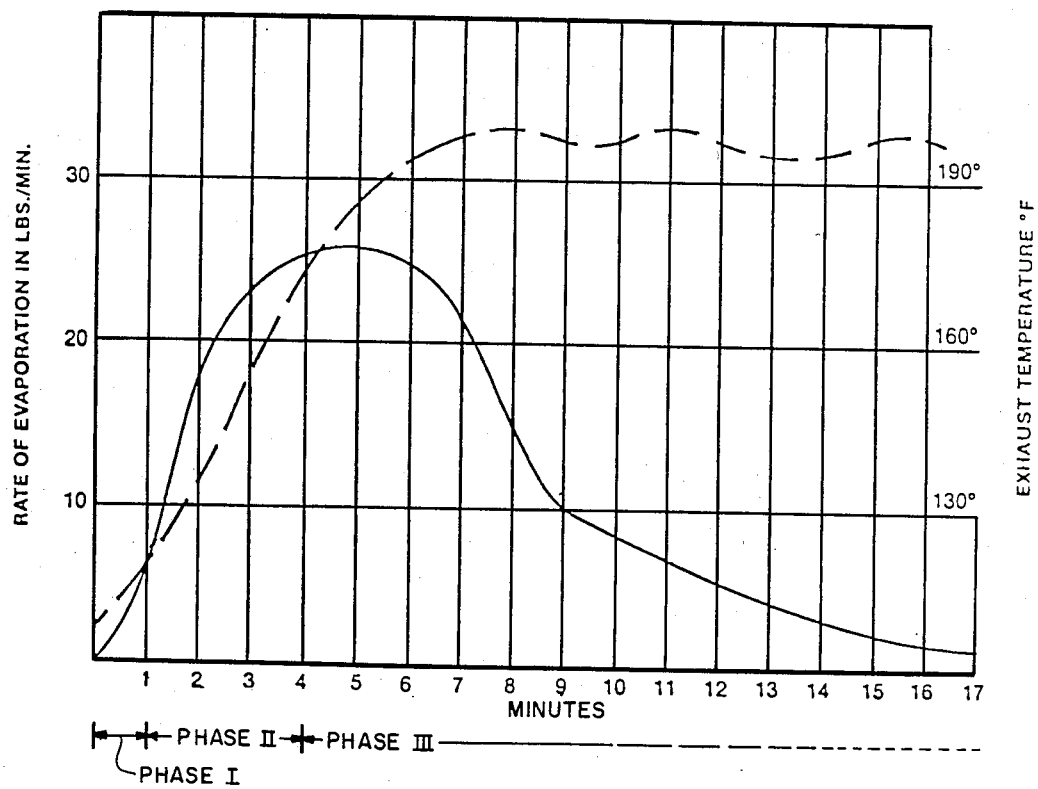
FIG. 8 is a chart illustrating the relationship of the temperature, evaporation rate and time parameters during a drying cycle.

With reference now to FIGS. 6-8 there is illustrated another embodiment of the invention which utilizes various other monitor points of a conventional dryer to optimize the performance of the drying cycle. FIG. 6 shows the general construction of the second embodiment of the invention having similarly structured apparatus as shown in FIG. 1 identified by like-numbered reference characters. The description of the FIG. 6 embodiment will be drawn to the distinctions between the two embodiments, it being realized that the system of the second embodiment otherwise functions in a manner similar to that of the first embodiment.

As described in connection with the air recirculator-mixer of FIG. 1, the system of FIG. 6 similarly monitors the drying cycle of the conventional dryer, along with air temperature indications to dynamically control the fresh air and exhaust dampers. Particularly, a programmable controller 160 has an electrical monitor input 162 to the dryer blower 14, an input conductor 164 to a temperature sensor T1 located upstream the mixing chamber 28, and an input conductor 168 connected to a second temperature sensor T2 disposed downstream the mixing chamber 28. While the controller 160 according to the alternative embodiment is not software programmed, it is nonetheless programmed by the selection of varius plug-in modules, all of which will be fully described in connection with FIG. 10.

The controller input conductor 162 is connected to the blower motor 14 to monitor when the blower has been activated to thus provide the controller 160 with an indication that the operator has manually started a drying cycle. Other drying system monitor points may be selected to yield a similar indication of the start of a drying cycle. Rather than monitor a dryer thermostat for high and low fire indications, generally available in gas fired dryers, the controller 160 of this embodiment monitors air temperatures upstream and downstream the mixing chamber 28, and through the processing of such data it dynamically adjusts a fresh air damper 172 and an exhaust damper 174 according to a predetermined scheme. It should be understood that the burner 42 of the second embodiment is yet controlled by a thermostat arrangement independently of the programmed controller 160. It should also be appreciated that the controller 160 indirectly affects the burner 42 insofar as the amount of fresh air admitted into the system via fresh air vent 32 changes the temperature of the system air, and through the conventional burner thermostat the burner cycle is correspondingly changed.

The mixer damper 37 of the first embodiment is eliminated in favor of the damper arrangement shown in FIG. 6 as the latter arrangement is effective to divert moisture-laden hot air through exhaust vent 30, or permit hot air to freely pass to return duct 38, all without the intervention of a third damper. Fresh air damper 172 and exhaust damper 174 are linked together, as represented by dotted line 176, to the motor lever arm 59 such that both dampers open and close by corresponding amounts. It will be described in detail below the manner in which the damper motor 52 receives signals to rotate its rotor clockwise (CW) or counterclockwise (CCW) to selected angular positions.

In the preferred form of the alternative embodiment the programmed controller 160 is also provided with an input connection 165 to a cooling cycle timer 180 to detect the commencement of a cooling cycle, and thus to detect the completion of a heat cycle. The heat cycle timer 178 is connected to the cooling cycle timer 180 by a standard electrical connection 182 in such a manner that the completion of a heat cycle automatically triggers the cooling cycle timer 180 to commence a cooling cycle. This is generaly accomplished by the use of a single pole double throw switch.

Briefly described, the programmed controller 160 automatically compensates for variables, which inevitably occur, in the degree of moisture extraction from one load to another, in the size and types of loads processed by the dryer, and the room air which is drawn into the system through worn seals. It will also be described in more detail later how this arrangement automatically and dynamically compensates for changes in outdoor temperatures without the need for a temperature sensor external to the system. The programmed controller 160 of this embodiment also responds to a plurality of inputs and, according to a predetermined scheme, produces electrical output signals for driving an electrical motive means and adjusting the dampers.

With reference to FIG. 7 of the drawings the first phase of the drying cycle commences when push-button 99 is depressed. As a result, the dryer blower motor 14 is energized and an electrical indication thereof is coupled by input conductor 162 to and detected by the programmable controller 160. The programmable controller 160 produces, according to its scheme, an electrical signal on an output conductor 53 to rotate the damper motor 52 in one direction or the other and thereby adjust fresh air damper 172 and exhaust damper 174. In this manner, a large amount of hot air is recirculated for a short period of time to elevate the operating temperature of the duct work, the dryer itself and the fabric load. This is the first phase of the drying cycle and is intended to raise the operating temperature of the system as rapidly as possible. The brief period of time comprising the first phase is generated by the programmable controller 160 and is not a function of the temperature appearing on input temperature conductors 164 or 168.

At the beginning of the second phase of the drying operation the programmable controller 160 produces an electrical signal on conductor 53 which causes the damper motor 52 to again adjust the fresh air and exhaust air dampers 172 and 174 to respectively input and discharge approximately 50-60 percent of the system air during the massive release of moisture from the surface of the fabrics being dried. With this damper adjustment setting about 50-60 percent of the system hot air is being discharged through the exhaust vent 30 and, because of the negative air pressure in the return duct 38, a corresponding amount of fresh air is drawn into the system through the fresh air vent 32. In this manner, an equal amount of fresh dry air is drawn into the system to replace the same amount of moist hot air discharged, whereby the mixed air which passes through return duct 38 is more effective in removing the remaining moisture in the fabrics. As noted before, it is seen that as the exhaust damper 174 is opened to exhaust hot air it also acts as a splitter damper to divert the desired portion of moist hot air to the atmosphere and direct the remaining portion into the mixing chamber 28 where it is mixed with fresh air drawn in through vent 32.

Experimental tests have shown that 40 to 50 percent of the moisture in a load will be evaporated during the first three to five minutes of the drying cycle. Of course, variations in the degree of evaporation, and the size of the load as well as the type of fabric being dried have an effect on the rate of evaporation. Thus, the second phase of the drying cycle is programmed to last for approximately three minutes for general fabric loads.

At the end of the second phase of the drying cycle, the programmed controller 160 enters a third phase which produces output electrical signals for adjusting the dampers in response to temperature indications as measured by a temperature sensor T1 and a temperature sensor T2. This third phase of the drying cycle is programmed to include two parts, the first of which lasts for approximately five minutes (sectioned into five one-minute intervals), and the second part which lasts the duration of the heat cycle. Within each one-minute time interval of the first part the programmable controller 160 compares the temperatures measured at T1 and T2 and adjusts the fresh air and exhaust dampers 172 and 174 such that the temperature at T2 is a specified percent of the temperature measured at T1. Moreover, the percentage or ratio of temperatures at T1 and T2 changes for each interval of time, according to the scheme programmed in the controller 160.

Specifically, during the first one-minute interval the dampers 172 and 174 are adjusted such that fresh air is drawn into the mixing chamber 28 to the extent that the air temperature at sensor T2 is approximately 80% of the temperature as measured by a sensor T1. The percentages of T2 and T1 temperatures for the remaining four one-minute time intervals are respectively 85%, 90%, 93% and 95%. These percentages were derived experimentally and have been found to optimize the drying cycle for general purpose loads. During each such interval the programmable controller 160 continuously monitors the T1 and T2 temperatures to achieve a damper adjustment satisfying the temperature percentage criterion for that interval. It is seen then that the programmable controller 160 "hunts" for the proper damper adjustment until the specified T1/T2 percentage has been found. As the velocity of air within the system may attain a velocity of 1200 feet per minute, the dryer system air stabilizes to a quiescent temperature quickly after damper adjustments have been made. Those skilled in the art may find that other time intervals and percentages may be used to optimize other types of systems or drying loads. By programming temperature sensor T2(170) to demand a temperature which is a percentage of that measured at temperature sensor T1(166), two important results are accomplished. First outside air will be mixed with the heated recirculated air to drop the temperature of the air at temperature sensor T2(170). This provides air which has a lower relative humidity which then has the ability to absorb more moisture to speed up the drying process.

Secondly, by demanding such a temperature at temperature sensor T2(170), a negative air pressure is maintained in return duct 38. This allows the dryer to operate effectively and efficiently.

After the end of the five one-minute intervals, the fresh air and exhaust dampers 172 and 174 remain at the setting which was found to satisfy the fifth interval, namely, the T2=0.95 T1 relationship. This comprises the second part of the third phase. The temination of the heating cycle, as determined by the heat cycle timer 178, ends the third phase of the programmable controller scheme. While the heat cycle timer 178 is not monitored by the programmable controller 160, the cooling cycle timer does have a monitor conductor 165 to the programmable controller 160 and thus the commencement of a cooling cycle is an implicit indication, as noted before, that the heat cycle has terminated.

In response to an input electrical signal on conductor 165 signaling that a cooling cycle has started, the programmable controller 160 produces an output signal to the damper motor 52 to fully open the fresh air and exhaust dampers 172 and 174 to discharge 100 percent of the system hot air and draw in 100 percent fresh air to cool the fabric load as quickly as possible. This action decreases the cooling cycle time and gives the fabrics a desirable fresh air smell. Upon sensing the termination of a cooling cycle on input 165 the programmable controller 160 energizes the damper motor 52 to adjust the dampers 172 and 174 to substantially closed positions. The controller 160 is then ready to start another drying cycle upon an indication that the blower 14 has again been energized by pushbutton 99.

During the heat cycle, the programmable controller 160 senses the input conductor 162 to blower 14 to verify that the drying cycle has not been manually terminated by the start/stop switch 99. In the event the dryer system has been manually brought to a halt, the electrical indication thereof on conductor 162 is delayed for a predetermined period of time, and thus the controller 160 will not note such an indication on input conductor 162 unless the drying cycle has not been recommenced by the depression of the start switch 99. In the event the drying cycle is restarted within the predetermined delay period, the controller 160 continues as if an interruption had never occurred. If the drying cycle remains terminated for a time greater than the predetermined time delay, a restart of the drying system by pushbutton switch 99 will cause the programmed controller 160 to reenter phase one of the drying cycle.

In accordance with a feature of the alternative embodiment of the invention the dynamic comparison of air temperatures upstream and downstream the mixing chamber automatically compensates for changes in the outdoor air temperature. As a result, when the outdoor temperature is low only a small quantity of air is required to be mixed with the system hot air in order to effect the lowering of the temperature as monitored by temperature sensor T2. This small quantity of added cold air expands when heated by the burner 42 and has the effect of lowering the absolute humidity of the air mixture. Conversely, when the outdoor temperature is high, such as in the summer, a larger quantity of fresh air is required to be mixed with the system hot air in order to lower the temperature of the mixture. This feature of adding fresh air to the mixture is highly desirable and consonant with the thermodynamic principle that a small quantity of cold air, when heated, expands and has the same effect of lowering the absolute humidity of the mixture. Therefore, because the fresh air drawn into the system through vent 32 must necessarily pass over the temperature sensor T2, the processing of the T2 temperature data automatically accounts for changes in the outside air temperature.

Another desirable aspect flowing from the use of temperature sensors T1 and T2 displaced respectively upstream and downstream the mixing chamber 28 is that the leakage of ambient air around the dryer through the dryer seals, and into the negative air pressure drying chamber is automatically taken into consideration. It is a well-known and inescapable problem that the seals around the various moving parts of the dryer system wear and allow the surrounding room air to be drawn into the drying system. If the seals around the rotating drying chamber 10 are excessively worn, as much as 4,000 cubic feet per minute of room air can be drawn into the system. This large quantity of leakage air causes a build up of positive air pressure at the intake of the heat source and therefore becomes excessive air which must be discharged to the atmosphere. Because a specific temperature percentage is demanded at sensor T2 during the third program phase, which temperature is always lower than that measured at T1, the only way such temperature change can occur is to mix a portion of the lower temperature fresh air with the system hot air. This provision ensures that during the third phase the dryer system will always supply fresh air to the dryer rather than 100 percent recirculated air. This is in keeping with the principle that the absolute humidity of moist hot air decreases as cooler fresh air is mixed.

Figure 9:
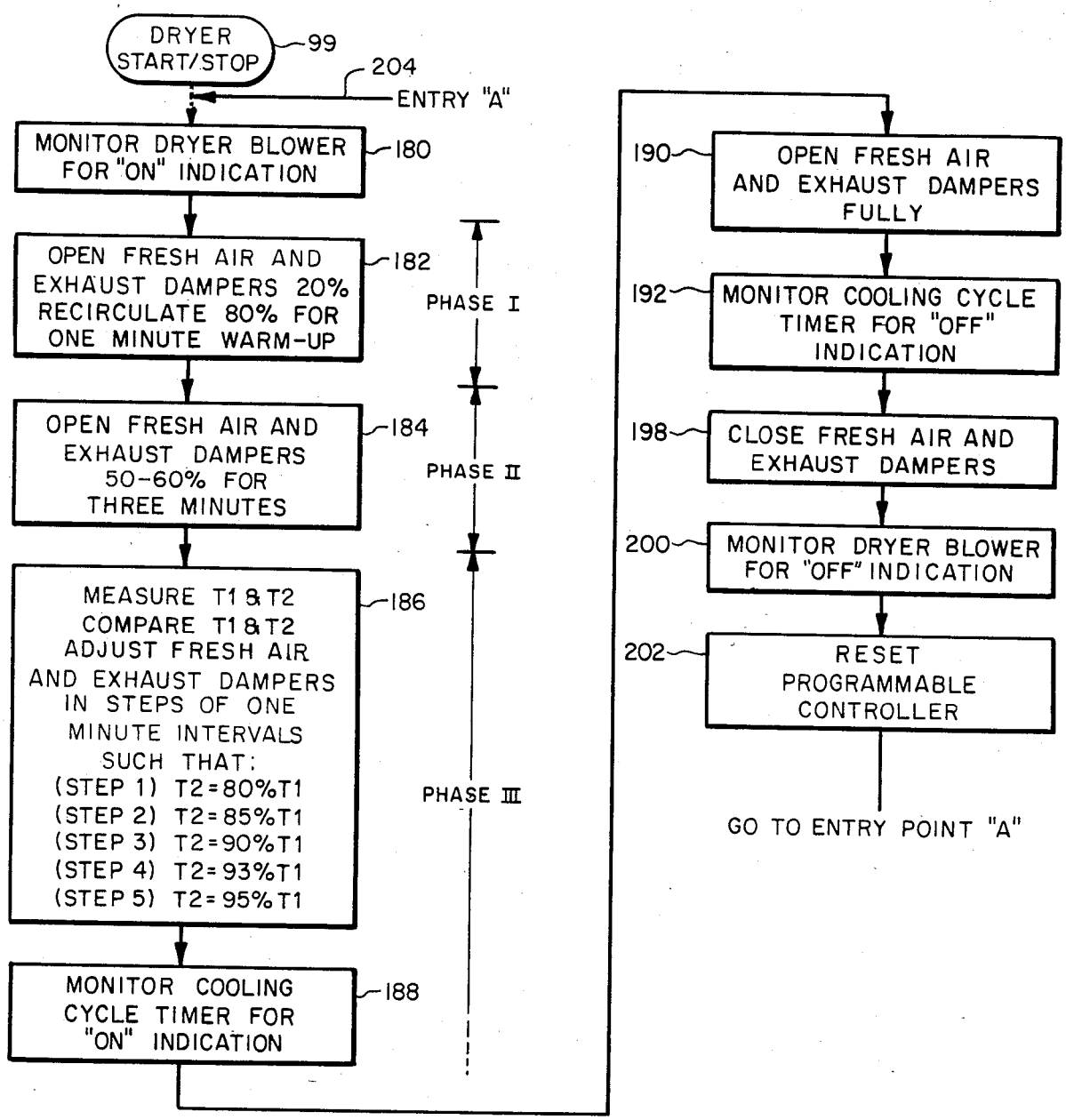
FIG. 9 is program flowchart depicting the various controller actions produced in response to electrical input stimuli.

With reference now to FIG. 8 in conjunction with FIG. 9 there is illustrated the relationship between the parameters of a typical drying cycle, and the scheme under which the programmable controller 160 operates to optimize the drying cycle and thereby achieve an increased efficiency in the system. As can be seen in FIG. 8, the relationship between the rate of evaporation (the solid line) and the exhaust air temperature (the dotted line), with respect to time, is shown. The evaporation rate steadily increases between the first and fourth minute, slows down during the fourth minute and rapidly decreases between the fifth and ninth minute. Between the ninth and seventeenth minute, the moisture release from the fabric steadily decreases, while the amount of air moving through the system remains constant. Accordingly, the air circulating in the system during the ninth through seventeenth minute contains increasingly less moisture and is more desirable to reuse to thereby contribute to the increased efficiency of the dryer system. By having temperature sensor T2(170) demand a higher percentage of the temperature at temperature sensor T1(166), as the drying cycle progresses, an increasing proportion of the air circulating between the ninth and seventeenth minute is recirculated.

In this alternative embodiment of the invention the programmed controller 160 produces desired output signals on conductors 53 based upon the various input indications on its input monitor conductors. The programmable nature of the controller 160 enhances the system flexibility by permitting the user to change or modify the operations thereof when the need arises, without the need to change or rewire the circuitry. However, it should be understood that the end result of those operations depicted on the flowchart of FIG. 9 can be achieved with a software controlled processor as distinguished from the combinational and sequential circuit controller described in conjunction with FIG. 10.

The simplified flowchart of FIG. 9 shows the basic functions undertaken by the programmable controller 160 according to its designed scheme. Specifically labeled are the three functional phases of the programmable controller 160 which are also shown as segmented time intervals under the chart of FIG. 8. Before the commencement of a drying cycle the programmable controller 160 is ready to act upon an indication that the dryer has been started by an operator. As noted before, the programmable controller 160 monitors input conductor 162 to determine if the dryer blower has been started by the action of the dryer start button 99 (functional block 180). On a positive indication that a drying cycle has started, i.e., the dryer blower is on, the controller 160 executes phase I, designated by functional block 182 in the flowchart.

FIG. 8 shows that during phase I the rate of evaporation, as well as the temperature within the system, is low, but is increasing. It is thus the purpose of this phase to recirculate 80 percent of the system air to thereby increase the temperature of the system structure as well as the fabric load. A timer in the controller 160 permits this phase to last for approximately one minute, and on the expiration thereof phase II is automatically initiated. The functional block 184 comprising phase II is designed to maximize the efficiency of the drying system during that period of time when the rate of evaporation of moisture from the fabrics is at its greatest (FIG. 8). To that end, the programmable controller 160 produces an electrical output signal on conductor 53 which rotates the damper motor 52 by an amount which exhausts 50-60 percent of the humid air and draws 50-60 percent fresh air into the system. Again, an internal controller timer sets the time limits of phase II to about three minutes whereupon the programmable controller 160 automatically proceeds to phase III.

Thus far, the programmable controller 160 has responded only to the input indication that the blower 14 has been activated, and based upon such indication, with the aid of internal timers, specific damper settings are established according to the predetermined scheme.

After the expiration of approximately three minutes, denoting the end of phase II, the programmable controller 160 generates the electrical signals necessary to carry out functional block 186—the initial part of phase III. FIG. 8 of the drawings illustrates that phase III generally begins when the majority of the surface moisture has been evaporated from the fabrics, and the remaining moisture is embedded within the fabric seams and material threads. In the first part of phase III the programmable controller 160 responds to electrical indications of temperatures on input conductors 164 and 168 (FIG. 7). In carrying out this initial part of phase III the programmable controller 160 responds to a T1 temperature indication and a T2 temperature indication, and then makes a comparison to determine whether T2 equals 80 percent of T1. If this equality does not exist the damper settings are adjusted in such a direction as to bring step 1 of phase III closer to the noted equality. It will be described in detail below the method of feedback between the controller 160 and the damper motor 52 which assures that a desired angular motor rotation has been achieved. This initial damper setting is maintained for a one-minute period, as determined by the controller timer.

Once the internal timer of the programmable controller 160 has signaled that approximately one minute has elapsed, step 2 becomes the operative step of phase III where the dampers 172 and 174 are adjusted such that $T2 = 0.85\ T1$. In like manner the controller 160 sequentially executes each of the remaining steps to adjust the fresh air damper 172 and exhaust damper 174 according to the scheme to optimize the reuse of system hot air which, in this phase, includes decreasing amounts of moisture.

Once step 5 of phase III has been executed, the dampers 172 and 174 remain as last adjusted ($T2 = 0.95\ T1$), and the programmable controller 160 remains in an inactive state until the termination of the heat cycle (and thus the start of a cooling cycle) as noted on input conductor 165. This is the second part of phase III and is indicated in FIG. 8 where the rate of evaporation continues to decrease. Phase III has been described above as it applies to the batch drying of textiles. Of course, it may be preferred, and indeed it may be necessary to modify the number of steps of Phase III, or the time intervals thereof to optimize the evaporation of moisture from goods other than textiles.

It should again be emphasized that while the T1/T2 relationship is predetermined, the damper settings resulting from functional block 186 of phase III are not predetermined, but rather take on different settings depending on the amount of load, type of load and the outside temperature.

In accordance with one aspect of the invention the placement of the T2 temperature probe downstream the fresh air vent 32 permits the measurement of the temperature of the reused hot air mixed together with the fresh air and thus automatically accounts for load size or outside air temperature, or changes therein.

As noted above, the heat cycle timer 178 includes a connection 182 to the cooling cycle timer 180 such that the termination of a heating cycle produces an immediate commencement of a cooling cycle. In this manner, and since it is realized that the heat cycle and the cooling cycle are mutually exclusive events, an indication that one such cycle is in progress is an implied indication that the other cycle is not active. While the preferred form of the alternative embodiment describes the monitoring of the cooling cycle timer, the heat cycle timer may be monitored in lieu thereof.

During the latter part of phase III of the drying cycle where the rate of evaporation decreases and the exhaust temperature stabilizes (FIG. 8), the programmed controller 160 continues to monitor the cooling cycle timer for an indication that such a cycle has commenced (functional block 188). In this event, the fresh air damper 172 and exhaust damper 174 are fully opened as a result of the execution of functional block 190. The dampers 172 and 174 being opened 100 percent, allow the hot air within the system and fabrics to be discharged, and fresh cool air to be drawn into the system to cool the fabric load so that it can be handled by operators. It is also desirable to cool a fabric load to prevent the accumulation of high internal temperatures often experienced in a pile of hot fabrics.

The programmable controller 160 continues in functional block 192 during the presence of a cooling cycle, and on a negative indication thereof the controller 160 executes functional block 198 where the fresh air damper 172 and exhaust damper 174 are closed. This latter action prevents cold air, especially in the winter, from entering the system via the fresh air vent 32 or exhaust vent 30 and unnecessarily cooling the system structure as noted above.

From functional block 198 of FIG. 9 the programmable controller 160 proceeds to block 200 where it monitors the blower status. When the blower automatically shuts down due to the termination of the drying cycle, this is noted by programmable controller 160 whereupon various circuits therein are reset in preparation of another drying cycle.

Programmable Control Unit Circuit Operation

Figure 10:
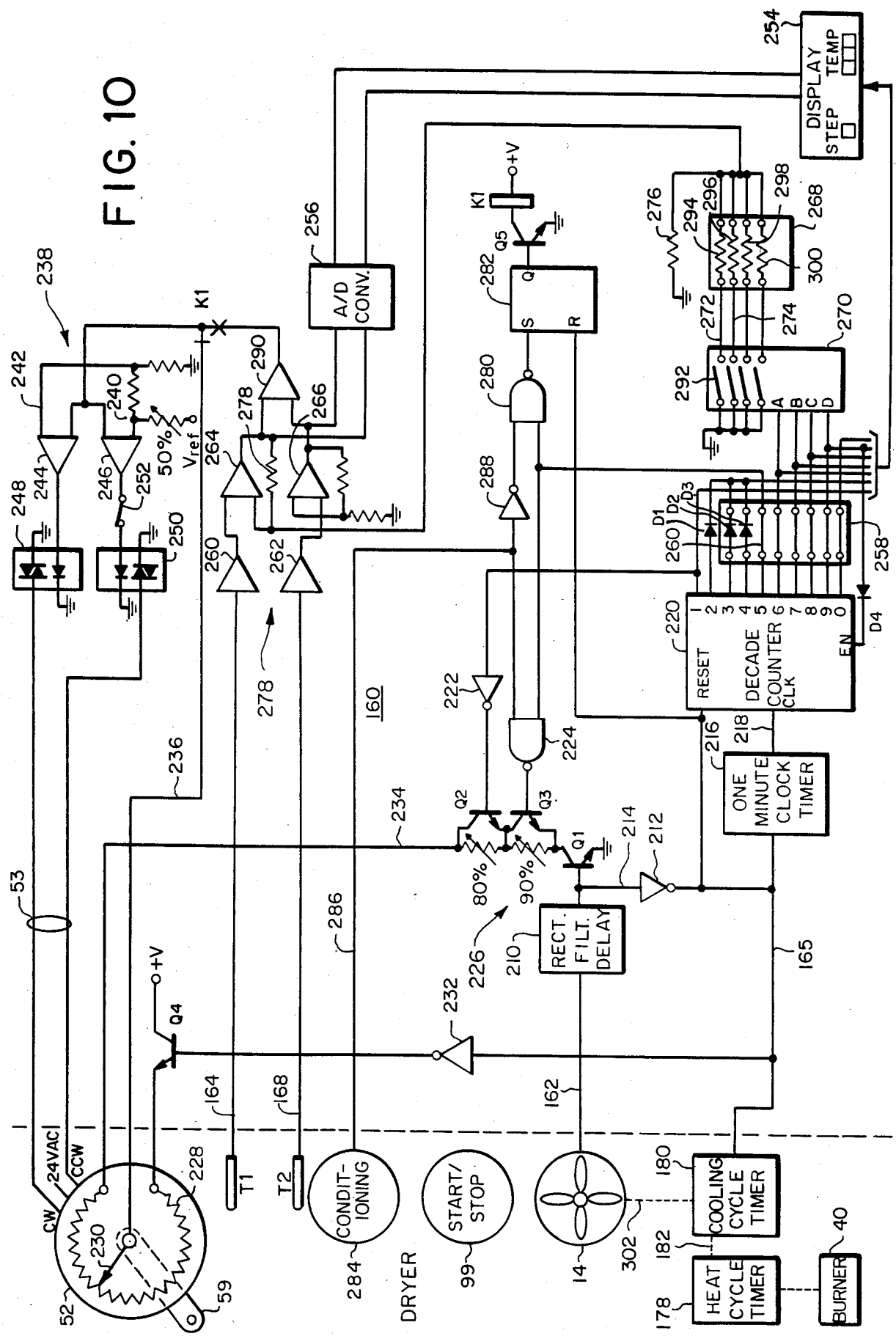
FIG. 10 is a simplified electrical schematic drawing of the programmed controller according to an alternative embodiment of the invention.

With reference now to FIG. 10, there is shown a simplified electrical drawing of the programmable controller 160 employed according to the alternative embodiment of the invention to effect the drying cycle illustrated by the functional blocks of FIG. 9.

On the left side of FIG. 10, there is shown the damper motor 52, the blower 14 and the cooling cycle timer 180 which are standard equipment purchased with conventional drying systems. The programmable controller 160, shown in the major portion of the FIG. 10, monitors such standard equipment by various interconnecting monitor conductors.

While, as noted above, the programmable controller 160 is not of the software controlled type, it is considered herein programmable as various modules can be easily and quickly changed with different modules to change the sequence of operations which constitute a drying cycle. While some functional operations of the drying cycle remain unchanged, others, such as desired damper opened or closed positions, the number of time interval steps which comprise phase III, and the various percentage ratios of T1/T2 computed during phase III may be changed.

In accordance with the invention, the programmable controller 160 monitors the on-off state of the blower 14 by sensing electrical signals on input monitor conductor 162. A rectifier-filter and delay circuit 210 is interposed between the blower 14 and the controller 160 for rectifying and filtering the 110 VAC blower signal and making such signal compatible with the logic levels of the controller circuitry. On a positive indication of the blower operation on input conductor 162, the resultant logic signal is immediately applied to transistor Q1 and inverter 212. In contrast, on disappearance of an indication of blower operation on input conductor 162, a 30-second delay of the resultant logic signal occurs before it is applied to transistor Q1 and inverter 212. Circuit 210 includes a timer circuit (not shown) which is transition sensitive such that a negative indication of blower operation does not produce an immediate output on circuit conductor 214 unless a 30 second interval has passed and the blower operation has not recommenced in such time interval. In other words, if the blower 14 has been shut down and restarted within a 30 second interval, no output is produced by the delay circuit 210 and thus no shut down signal is generated on circuit conductor 214. The programmable controller 160 therefore continues its operation and is unaffected by the brief shutdown period of the blower 14. This feature is highly useful for many obvious reasons, including the elimination of the need to restart the drying cycle because of brief interruptions which may be a necessary part of the procedures in a laundry facility.

Assuming now that a drying cycle has been commenced by the depression of the start button 99, and thus the startup of the blower 14, the resultant logic signal on circuit conductor 214 initiates two actions.

First, inverter 212 produces a logic level which enables the one-minute clock timer 216. This is the internal timer responsible for generating the one-minute time intervals which, when either considered together or by themselves, define the various phases of the drying cycle referred to in connection with FIGS. 8 and 9. At the start of the drying cycle, and thus at the start of phase I thereof, the one-minute timer 216 generates a pulse on output 218 which clocks a decade counter 220 whereupon a positive logic level is produced on the "1" output. As a result of the output on decade counter 220, transistor Q2 is turned off by inverter 222. The remaining outputs of the decade counter 220 being at logic low levels, and particularly the output "5" which, when coupled to NAND gate 224, turns on transistor Q3 and shortcircuits the potentiometer designated "90%". Transistor Q2 being off and transistor Q3 being on renders the equivalent resistance of the potentiomenter circuit equal to that of the potentiometer labeled "80%".

The second action occasioned by the output of the rectifier filter circuit 210 is that transistor Q1 turns on thereby completing the electrical circuit through the potentiometer circuit 226. The potentiometer circuit 226 is connected to the damper motor 52 which, in the preferred form of the invention, is a 24Vac "MODU-TROL" motor manufactured by the Honeywell Corporation. This type of motor includes an internal stationary potentiometer resistance element 228, and a rotatable wiper arm 230 which is fixed to the motor shaft (not shown) and which contactingly wipes across the resistance element 228 as the motor rotor turns. Current is supplied to the resistance element 228 through transistor Q4 which is turned on through inverter 232 so long as the cooling cycle timer conductor 165 remains at a logic low indicating the presence of a heating cycle. The other end of the motor resistance element 228 is connected by circuit conductor 234 to the potentiometer circuit 226. It is thus evident that when one of the damper motor conductors 53 is activated to rotate the rotor in either a clockwise or counterclockwise direction, the wiper arm 230 correspondingly rotates across the resistance element 228 and produces an output voltage on conductor 236 which is indicative of the angular position of the rotor and thus the representative of the angular position of lever arm 59 connected thereto. Therefore, as the programmable controller damper 160 energizes one of the damper motor conductors 53 to effect an adjustment of the dampers, a voltage is fed back to the programmable controller 160 on conductor 236 so that it is known in which direction to turn the motor rotor to achieve the desired damper setting, as well as determine exactly when the desired angular rotation has been achieved.

Comparator 238 is connected to the motor feedback conductor 236 through a normally closed relay K1 contact, and is compared with two different bias voltages appearing on comparator inputs 240 and 242. Depending upon the angular position of the rotor, and thus the potentiometer wiper 230, the feedback voltage on conductor 236 is compared against the bias voltages on inputs 240 and 242 and the difference therebetween will cause either comparator amplifier 244 or 246 to generate an output and rotate the damper motor rotor respectively clockwise or counterclockwise. The change in the rotor angular position is in such a direction as to reduce the difference between the voltages appearing on feedback conductor 236 and bias voltages on inputs 240 and 242.

An output on comparator amplifier 244 causes the clockwise (CW) winding of the damper motor to be energized by way of an optically coupled solid state AC switch device 248. An output on comparator amplifier 246 comparably energizes the counterclockwise motor winding through solid state AC switch 250. The significance of the normally closed switch 252 interposed between the comparator amplifier 246 and AC switch 250 will be fully discussed below.

In view of the foregoing description of the damper motor control circuit it is seen that the interposition of the non-shorted resistances of the potentiometer circuit 226 in series with the damper motor resistance element 228 effectively changes the feedback voltage on feedback conductor 236. In brief summary, therefore, on the initial indication that the blower 14 has started, potentiometer 80% is interposed into the damper motor circuit and, depending upon the angular position of wiper 230 and thus the voltage on feedback conductor 236, the comparator 238 energizes either the CCW or the CW motor winding to rotate the motor 52 in a direction to recirculate 80% of the dryer system air, and thus exhaust 20%. This corresponds to phase I represented generally by functional block 182 of FIG. 9.

Phase I of the drying cycle is terminated by the generation of a clock pulse on the output of the one-minute timer 216 on its own accord. This has the effect of shifting the logic high signal from the decade counter "1" output to the "2" output. The logic low now appearing on the "1" output is inverted by inverter 222, turns on transistor Q2 and short circuits the 80% potentiometer. Thus, both resistances of the potentiometer circuit 226 are now short-circuited and effectively removed from the damper motor resistance circuit 228.

A visual display 254 is provided for yielding an indication of the progress of the drying cycle, as well as the temperature of the air within the system as measured by either temperature sensor T1 or T2. A pair of analog-to-digital converters 256 are provided for converting the analog voltage representation of the temperature into a corresponding digital representation for use by the visual display 254. As each output of the decade counter 220 becomes sequentially activated indicating the various time intervals throughout the entire drying cycle, such outputs are coupled to the visual display 254 for indicating the minutes elapsed within the drying cycle.

Because phase II of the drying cycle (FIG. 8) begins one minute into the drying cycle, and lasts for three minutes, the second, third and fourth outputs of the decade counter 220 are diode anded together on the output side of option module 258 and coupled therefrom to the visual display 254. It is seen that the active state of these decade counter outputs has no effect on the remaining circuitry of the programmable controller 160 during phase II. However, since the 80% potentiometer was short-circuited and thus removed from the motor resistance circuit 228 unbalanced voltages appear at the input of comparator 238. In response to this unbalance an output is generated by either comparator amplifier 244 or amplifier 246 to energize the respective motor CW or CCW winding and rotate the rotor in a direction to reduce the voltage imbalance on the input of the comparator 238. The 50% potentiometer connected to the input 240 of comparator amplifier 246 presents a bias voltage on such amplifier such that the imbalance disappears when the damper motor has rotated to a position in which the damper is approximately 50% open. The 50% potentiometer is variable so that the positions of the fresh air and exhaust dampers 172 and 174 can be preadjusted as desired. Accordingly, in the alternative embodiment such dampers permit 50% of the system air to be recirculated in accordance with phase II as shown in FIG. 9. Since it is anticipated that phase II will generally comprise at least one minute, diode D1 is permanently wired into the controller circuit, but diodes D2 and D3 are wired as part of the option module 256. The option module 258 is removable from the programmable controller circuit 160 and replaceable by another module which may be wired with a different number of diodes and shorting straps. In this regard, the operation of the programmable controller 160 can be changed or modified and is therefore considered herein as being programmable.

In any event, phase II of the drying cycle continues until the clock timer 216 has produced the fifth clock pulse wherein output "5" of the decade counter 220 becomes active and phase III of the drying cycle commences. In this phase of the drying cycle the dampers 172 and 174 are adjusted according to the temperature of the system air as measured upstream and downstream the mixing chamber 28 (FIG. 6).

According to an important feature of the invention, the fresh air damper 172 and exhaust damper 174 are dynamically adjusted with regard to the air temperatures as measured by sensors T1 and T2. In FIG. 10 temperature sensor T1 is connected to a temperature-to-voltage converter 260 by conductor 164. Temperature sensor T2 is comparably connected to the temperature-to-voltage converter 262. The particular temperature measuring elements used in conjunction with the sensors T1 and T2 are Motorola silicone transistors type MPF 102.

The output of each temperature-to-voltage converter is applied to a respective comparator amplifier 264 and 266 where each voltage is compared with other input reference voltages. On one input of comparator amplifier 266 appears a fixed reference voltage. The reference voltage appearing on an input of comparator amplifier 264 is progammable according to which resistor in option module 268 is switched to ground by the analog switch 270. Analog switch 270 is a conventional circuit where each input A, B, C and D is associated with a respective internal solid state switch, and a logic high on any input closes its respective switch. It is seen that the input side of each switch is grounded and the output side thereof is connected to a respective resistor in the resistor module 268.

Each resistor in module 268 connected in common at the output side thereof and coupled to the input of comparator amplifier 264 plays a role in determining the overall gain of the amplifier. Fixed resistor 276 is permanently grounded and, in conjunction with feedback resistor 278 of amplifier 264, a gain of such amplifier is established. The further grounding of the remaining resistors in module 268 through the switches of circuit 270 changes the gain of amplifier 264 in accordance with the particular logic high signal appearing at the address inputs of analog switch 270.

According to the first part of phase III of the drying cycle the fresh air damper 172 and exhaust damper 174 are dynamically adjusted according to the ratio of temperatures as measured by sensors T1 and T2. As heretofore described, an analog voltage on feedback conductor 236 was compared by comparator 238 against a fixed reference voltage, and when a difference between the two existed, the damper motor 52 was rotated in such a direction until such difference was reduced to zero. In phase III, however, the analog voltage compared by comparator 238 is switched by relay K1 contacts from the motor potentiometer wiper arm 230 to the output of the temperature comparator circuit 278.

To that end, phase III of the drying cycle commences when output "5" of decade counter 220 goes to a logic high level and through option module strap 260 gate 280 is enabled to set flip-flop 282 and operate relay K1 by transistor Q5. It should be noted that during the drying cycle if the conditioning 284 option has not been exercised, conductor 286 will be at a logic low and the output of inverter 288 will be high thereby permitting flip-flop to be set by NAND gate 280. Since the address inputs of the analog switch 270 are all at a logic low, none of the respective switches therein are closed and thus fixed resistor 276 is operative to control the gain of temperature comparator amplifier 264. According to step 1 of phase III, the value of fixed resistor 276 has been chosen to provide an amplifier 264 gain with an output voltage which, when compared against a reference voltage by comparator 238, produces motor rotation in a direction to adjust the dampers and establish a T2=80% T1 relationship. When this relationship is established the temperature-related voltage fed back to temperature comparator 278, via sensors T1 and T2, will reduce the voltage difference at the inputs of comparator 238 and thus stop the damper motor 52.

Temperature sensors T1 and T2, together with their respective converters 260 and 262, thus comprise the temperature/voltage converter of the programmable controller 160. Amplifiers 260 and 262 are conventional circuits which yield a 10 millivolt output change for every degree F change in temperature experienced by the respective sensors T1 and T2. Temperature comparator amplifier 266 amplifies the output of converter 262 by a fixed amount. Comparator amplifier 264 amplifies the output signal of converter 260 by an amount as determined by the particular resistors which are grounded in resistor module 268. As noted before, fixed resistor 276 is permanently grounded, and in this step of phase III, is the only resistor grounded.

The outputs of temperature comparator amplifiers 264 and 266 are applied to an analog-to-digital converter 256 and the result thereof coupled to the visual display 254 to indicate in digital form the temperatures appearing at T1 and T2. Temperature comparator amplifier 290 compares the outputs of amplifiers 264 and 266 also, and applies a resultant signal through the operated contacts K1 to the input of comparator 238 where it is compared with a fixed reference voltage.

Particularly, according to the first step of phase III, if the temperature at T2 equals 80% of the temperature at T1, the output voltage of temperature comparator amplifier 290 will be intermediate the fixed reference voltages appearing on inputs 240 and 242 of comparator 238. If, on the other hand, the temperature at T2 is greater than 80% of the temperature at T1, amplifier 290 will produce an output voltage which upsets the balanced input of comparator 238 such that comparator amplifier 244 activates the optical-coupled driver 248 to rotate the motor 52 clockwise and open the dampers to admit more fresh air and reduce the temperature at T2 until the desired ratio is achieved. Correspondingly, if the temperature at T2 is less thann 80% of the temperature at T1, comparator amplifier 246 energizes the optical-coupled driver 250 to rotate the motor and close the dampers until the desired ratio is achieved. Once the desired ratio of temperatures is achieved for that particular step in phase III, the motor is de-energized. However, should an imbalance at the inputs of the comparator 238 appear during the step currently being conducted, the motor 52 will be rotated until T2 again equals the desired percentage of T1. It is seen then that the dampers are dynamically changed throughout each step of phase III, as the need arises, to bring the temperatures as measured at T1 and T2 into the desired relationship.

As noted above step 1 of phase III lasts for one minute as determined by the one-minute clock timer 216. On the sixth minute into the drying cycle, output "6" of the decade counter 220 goes to a logic one level and the "A" input of the analog switch 270 is activated whereupon switch 292 closes and connects resistor 294 in parallel with fixed resistor 276. Because the effective total resistance at the input of comparator amplifier 264 is now changed, an imbalance will again appear at the input of comparator 238, the result of which will be the rotation of damper motor 52. It should be noted that this imbalance is caused as a result of the change in the gain of amplifier 264 rather than a change in the temperature as measured at sensors T1 or T2. The value of resistor 294 is selected such that its resistance, in parallel with that of resistor 276, changes the gain of amplifier 264 by an amount which causes an error at amplifier 238 sufficient to adjust the dampers such that T2=85% T1. It is seen then that fresh air damper 172 and exhaust damper 174 have been readjusted to the new position pursuant to step 2 of phase III, the temperature at T2 equals 85% that of T1, and no error or difference voltage appears at the input of comparator 238.

On the elapse of subsequent one-minute time intervals, the remaining address inputs of the analog switch 270 become successively activated thereby successively grounding gain resistors 296, 298 and 300. These resistors are then paralleled with fixed resistor 276, one at a time, and, through the temperature comparator 278 produce particular imbalances on comparator 238 so as to achieve the T1/T2 temperature relationships according to steps 3-5 of phase III.

Resistor module 268 is readily accessible and easily pluggable into the programmable controller circuit. It is highly important to note that the selection of different values for resistors 294-300 have the effect of changing the damper positions to achieve T1/T2 temperature ratios other than those disclosed in phase III of this embodiment. Therefore, the programmability of the controller 160 is enhanced by the replaceability of resistor module 268. In addition, the clock timer 216 may be made modularized so that time intervals other than one-minute intervals may be used to suit the particular needs of the drying system. Moreover, it is well within the ambit of those skilled in the art to produce a clock timer which produces outputs with different time intervals occurring within the same drying cycle.

Upon the occurrence of step 5 of phase III, the "9" output of the decade counter 220 becomes active, and is coupled back to its enable input by diode D4. This prevents further clock pulses on the decade counter input 218 from affecting the output and thus the damper setting as established in step five of phase III remains for the duration of the drying cycle.

According to the illustrated drying cycle of FIG. 9, the heat cycle is terminated when its timer times out whereupon the cooling cycle timer initiates the commencement of the cooling cycle. The programmable controller 160 monitors the cooling cycle timer 180 through conductor 165 which goes to a logic low level upon the commencement of a cooling cycle. The logic low on monitor conductor 165 resets flip-flop 282 thereby releasing relay K1, and also resets the decade counter 220 as well as inhibit the one-minute clock timer 216. Cooling cycle monitor conductor 165 also turns off transistor Q4 through inverter 232 and thus power to the motor potentiometer resistance 228 is removed. When Q4 is turned off, the resultant absence of the voltage on feedback conductor 236 to the comparator 238 causes an imbalance wherein comparator amplifier 244 activates the optically coupled driver 248 and the CW winding of the damper motor 52 is energized to thereby fully open the dampers. This is in accordance with the cooling cycle which exhausts system hot air and admits fresh air therein to quickly cool the laundry load and the drying system itself. This condition continues for as long as the cooling cycle is active.

The termination of the cooling cycle ends the drying cycle and shuts off the blower 14 via signal conductor 302. As a consequence, cooling cycle timer conductor 165 goes to a logic low level, thereby turning on transistor Q4, and turning off transistor Q1 through the rectifier filter circuit 210. This later action effectively removes motor conductor 234 from ground and thus feedback conductor 236 is essentially at the +V supply voltage. When a voltage with a magnitude of +V volts is applied to the comparator 238 via conductor 236, an input difference of such magnitude exists that the comparator amplifier 246 energizes the CCW motor winding to close the fresh air and exhaust dampers 172 and 174.

To prevent an excessive buildup of pressure within the drying system, limit switch 252 which is electrically interposed between comparator 246 and solid state ac switch 250, inhibits the exhaust damper from being fully closed. Switch 252 is a normally closed micro-switch and is physically mounted in exhaust vent 30. As the exhaust damper 174 closes it encounters the switch 252 when within about one inch of being fully closed thus operating it, opening its contacts and removing motor driving current in the CCW winding. When current flows in the motor CW winding the motor rotates in a direction which opens the vents thus closing switch 252 and returning it to a normally closed state.

The provision of limit switch 252 thus provides an escape opening in the system to maintain an exhaust route for hot air. This is advantageous in negative pressure drying systems as generally the pressure is rather constant in the system in view that the amount of air exhaust is replaced by an equivalent amount of air entrained into the system. However, when the seals around the various moving parts of the system become worn additional air is drawn into the system, such air being in excess of that exhausted into the system, such air being in excess of that exhausted and thus the internal pressure of the system rises. This situation is exacerbated when the vents are caused to be fully closed as then there is no exhaust route for the additional air drawn into the system via the worn seals. Hence, the inability of at least the exhaust damper of the present invention to close fully ensures that the system will be maintained at a negative pressure.

The termination of the cooling cycle on the timing out of the cooling cycle timer 180 ends the drying cycle, and as a result the fabrics have been cooled sufficiently for an operator to remove them from the chamber 10. All of the programmable controller circuits are also reset to an initial state and are ready to start another drying cycle on an indication that the blower 14 has been turned on.

As noted before, a conditioning option is provided as a variation to the drying cycle. Particularly, once the drying cycle has been started and the conditioning option selected, by depressing the conditioning switch 284, the first four minutes of the drying cycle, i.e., phase I and phase II, remain unchanged from that discussed above. However, the conditioning option eliminates phase III as it prevents the operation of relay K1 by maintianing a logic low on the input of NAND gate 280. The conditioning monitor lead 286 is high when the conditioning cycle is used, and through inverter 288 a logic low is applied NAND gate 280. Therefore, during the fifth minute of the drying cycle NAND gate 224 has two logic highs on its input and thus transistor Q3 is turned off interposing the 90% potentiometer within the damper motor circuit. The 90% potentiometer is preadjusted so that the fresh air damper 172 and exhaust damper 174 are adjusted by the motor 52 to recirculate approximately 90% of the system air. During the sixth through ninth time intervals the 80% and 90% potentiometers are short-circuited and thus the damper settings are established according to the resistance value of the 50% potentiometer as described above. During the remaining part of the heating and cooling cycle the programmable controller operates in a manner similar to that described before.

From the foregoing description it is seen that the present invention provides a heat recirculation system with a damper control which monitors the various timers and thermostats of a conventional dryer as indications of time periods and temperatures occurring within the drying cycle. Because the recirculation and damper control system only monitors the timers of the conventional dryer without actively controlling such timers or the dryer burner, the present invention is easily adapted to such drying systems to achieve increased efficiencies not heretofore obtained.

In summary, it is seen that the implementation of the programmable control unit to an existing dryer system is easily accomplished by simply installing a return hot air duct with a damper control system, and monitoring the standard operation of the dryer timers and thermostats. It should be understood that in the development of a new dryer system, the programmable control unit can control the various burners and timers rather than operating asynchronously with them.

It should now be further understood that the programmable control unit according to the present invention monitors the various dryer indicators during the dryer cycle to adjust the dampers to optimize the temperature and humidity conditions within the system. It has been found in actual practice that a conventional recirculation dryer system experiences about 5–15 percent reduction in fuel consumption. Such a system, however, equipped with the programmable controller reduces fuel consumption 25–45 percent. Therefore, the control of fresh air and exhaust air during the dryer cycle constitutes more than a mere fine tuning of the system, and in fact a substantial advantage is realized.

The various embodiments disclosed herein are intended to be exemplary of the principles of the invention and are not restrictive thereof since various modifications, readily apparent to those familiar in the art, may be made without departing from the spirit and scope of the invention as claimed hereinbelow.

What is claimed is:

1. In an air recovery and reuse drying system having an exhaust damper movable to a plurality of positions for selectively diverting air to be recirculated or exhausted during a drying cycle, an adjustable fresh air damper for controlling the amount of fresh air entrained into said system, a source of heat for heating air in said system, an improved damper control system comprising:

motive means connected to said exhaust damper and to said fresh air damper for adjusting each of said dampers to any one of the plurality of desired position;

monitor means operative to sense movement of air within said system and to produce a signal corresponding thereto;

temperature sensing means for sensing the temperature of the air within said system and producing a signal corresponding thereto;

processor means with a plurality of inputs for accepting input of said monitor means signal and said temperature sensing means signal and for generating a plurality of output signals to drive said motive means to adjust said exhaust damper and said fresh air damper to a corresponding plurality of positions allowing the air within the system to achieve a predetermined temperature thereby preventing build up of a positive air pressure in at least a portion of said system and for minimizing the fresh air admitted into said system during a latter part of said drying cycle while increasing the amount of hot air being recirculated.

2. The improved damper control system of claim 1 further including means responsive to said monitor means for producing signals on the output of said processor means for effecting first damper adjustments and timer means associated with said processor means for determining the duration of time said fresh air and said exhaust dampers remain positioned according to said first damper adjustments.

3. The improved damper control system of claim 1 further including inhibit means for inhibiting the complete closure of said fresh air damper to thereby ensure that fresh air is always supplied to said system.

4. The improved damper control system of claim 3 wherein said inhibit means includes an electrical switch connected to said motive means and disposed in the path of said fresh air damper so that when said fresh air damper moves toward a closed position said switch is activated whereby said motive means stops the further movement of said fresh air damper is arrested.

5. The improved damper control system of claim 1 wherein a temperature sensing means is connected to said source of heat to thereby control the amount by which the air in said system is heated.

6. The improved damper control system of claim 1 wherein said temperature sensing means is connected to said processor means to provide an indication of said air temperature.

7. The improved damper control system of claim 1 further including means responsive to said monitor means for producing signals at the output of said processor means for effecting first additional adjustments of at least one of said exhaust damper and said fresh air damper and means responsive to said temperature sensing means for producing signals at the output of said processor means for effecting second additional adjustments of at least one of said exhaust damper and said fresh air damper.

8. In an air recovery and reuse drying system having an exhaust damper movable to a plurality of positions for selectively diverting air to be recirculated or exhausted, an adjustable fresh air damper for controlling the amount of fresh air entrained into said system, a source of heat for heating air in said system, an improved damper control system comprising:

motive means connected to said exhaust damper and to said fresh air damper for adjusting each of said dampers to any one of the plurality of desired positions;

monitor means operative to sense movement of air within said system and to produce a signal corresponding thereto;

temperature sensing means for sensing the temperature of the air within said system and producing a signal corresponding thereto, said temperature sensing means comprising at least two temperature sensors disposed at different locations in said drying system;

processor means with a plurality of inputs for accepting input of said monitor means signal and said temperature sensing means signal and for generating a plurality of output signals to drive said motive means to adjust said exhaust damper and said fresh air damper to a corresponding plurality of positions, said processor means including comparator means for comparing indications of temperature of each said temperature sensor and producing electrical output signals in response thereto to achieve a predetermined temperature ratio thereby preventing build up of positive air pressure at, at least, one of said temperature sensors.

9. The improved damper control system of claim 8 wherein a first temperature sensor is disposed upstream said fresh air damper, and a second temperature sensor is disposed downstream said fresh air damper.

10. The improved damper control system of claim 9 wherein said comparator means includes means for comparing an indication of temperature produced by said first temperature sensor with an indication of temperature produced by said second temperature sensor, and for producing an electrical output signal for use in adjusting said fresh air damper to obtain said predetermined temperature ratio thereby maintaining a negative air pressure at said second temperature sensor.

11. The improved damper control system of claim 10 wherein said comparator means includes means for adjusting said fresh air damper to obtain a desired air temperature $T_2$ at said second temperature sensor as a percent of air temperature $T_1$ at said first temperature sensor.

12. The improved damper control system of claim 10 wherein said comparator means includes means for adjusting said fresh air damper to obtain a range of said percents over a period of time.

13. The improved damper control system of claim 12 wherein said temperature $T_2$ is maintained by the following relationship: $T_2 \leq 0.95(T_1)$.

14. The improved damper control system of claim 13 wherein said temperature range is adjusted in accordance with the following relationship: $0.80(T_1) \leq T_2 \leq 0.95(T_1)$.

15. The improved damper control system of claim 13 wherein said percents increase with the passage of time.

16. In an air recovery and reuse drying system having a mixing chamber for mixing fresh air with recirculated hot air, the hot air being heated by a source of heat in said system, a method of controlling the air temperature in said system during a cycle comprising the steps of:
monitoring an indication of a temperature T1 of the air in the system upstream of said mixing chamber;
monitoring an indication of a temperature T2 of the air in the system downstream of said mixing chamber;
adjusting the proportions of fresh air in said mixing chamber with said hot air in accordance with a predetermined scheme based on an anticipated rise in temperature in said recirculated air to attain a desired temperature T2 with respect to said temperature T1 and to maintain a negative air pressure in said mixing chamber and downstream of said mixing chamber, and for minimizing the fresh air moving into said system during a latter part of said cycle while increasing the amount of hot air being recirculated.

17. The method of controlling the temperature in the system of claim 16 wherein said adjusting step further includes adjusting said proportions to attain a desired temperature T2 as a desired percent of T1.

18. The method of controlling the air temperature of the system of claim 16 further including the step of changing the percent of T2 with respect to T1 as the drying cycle progresses.

19. The method of controlling the air temperature in the system of claim 17 wherein said temperature T2 is adjusted in accordance with the following relationship to maintain said temperature T2 less than said temperature T1 thereby maintaining said negative pressure in said mixing chamber and downstream of said mixing chamber: $T2 \leq 0.95(T1)$.

20. A heat recovery and reuse system for use on a dryer which includes a source of heat for generating hot air, an exhaust vent and associated damper for exhausting portions of said hot air, a fresh air vent and associated damper through which fresh air is admitted into said system and mixed with said hot air, electrical actuation means for commencing a drying cycle and being active during said cycle, temperature sensor means for yielding indications of air temperatures within said system, the heat recovery and reuse system comprising:
first means responsive to said electrical actuation means for opening said fresh air damper during an initial part of said drying cycle and circulating a majority of fresh air, said means operating independently of the temperature of air within said system; and
second means responsive to said temperature sensor means for adjusting said fresh air damper so as to minimize the fresh air admitted into said system during a latter part of said drying cycle, whereby a majority of hot air is recirculated within said system while maintaining a negative air pressure in at least a portion of said system.

21. The heat recovery and reuse system of claim 20 further including:
a timer; and
said first means includes means for adjusting said fresh air damper to different positions during said initial part of said drying cycle for periods of times as determined by said timer.

22. The heat recovery and reuse system of claim 20 further including:
a timer; and
said second means includes means for adjusting said fresh air damper to different positions during said latter part of said drying cycle for periods of time as determined by said timer.

23. The heat recovery and reuse system of claim 20 wherein said drying cycle includes a cooling cycle preceded by a heating cycle, said cooling cycle being initiated by a second electrical actuation means, and wherein said system further includes means responsive to said second electrical actuation means for opening said fresh air damper during said cooling cycle to thereby maximize the amount of fresh air admitted into said dryer system.

24. The heat recovery and reuse system of claim 23 further including a timer associated with said means responsive to said second electrical actuation means for defining a time period in which fresh air damper is opened and thereafter is substantially, but not fully, closed.

25. An air recirculator for use with a drying system having an air inlet for supplying fresh air to said system, a source of heat for heating air supplied by said inlet, a drying chamber through which said heated air is circulated, a blower for circulating air through said drying chamber, an exhaust outlet for emitting moist air circulated through said dryer, a timer for controlling the duration of the drying cycle, a thermostat connect to said source of heat for controlling the temperature of air heated by said source, the recirculator comprising:
an inlet and an outlet connected through passage means;
an exhaust vent within said passage means for discharging moist air circulated through said drying chamber;
an exhaust damper operable to adjust the amount of moist air discharged from said exhaust vent;
a fresh air vent within said passage means for providing a source of fresh air to said recirculator;
a fresh air damper operable to adjust the amount of fresh air drawn in through said fresh air vent;
motive means responsive to electrical signals for adjusting said exhaust and fresh air dampers;
temperature sensing means for sensing the temperature of air circulated through said air recirculator;
processor means having a plurality of inputs including a first input connected to said drying system and responsive to electrical signals representative of the presence of a drying cycle, a second input connected to said temperature sensing means, an output operative to produce electrical signals for drying said motive means, said processor means further including
(a) first circuit means responsive to electrical signals on said first input for generating electrical signals on said output to adjust said exhaust and fresh air dampers to predetermined positions.
(b) second circuit means responsive to indications on said second input for generating output electrical signals on said output to adjust said exhaust and fresh air dampers in accordance with the air temperature within said system to allow said system to maintain said air temperature while drawing in at least a small amount of fresh air and while maintaining a negative air pressure downstream of said fresh air damper.

26. The air recirculator of claim 25 further including a timer for generating a plurality of time intervals, and said first circuit means includes means responsive to said time intervals for effecting a predetermined different exhaust and fresh air damper position during each said interval.

27. The air recirculator of claim 25 further including a timer for generating a plurality of time intervals, and said second circuit includes means responsive to said time intervals for effecting a different exhaust and fresh air damper adjustment during each said interval.

28. The air recirculator of claim 26 wherein said processor means further includes adjustable means for altering said different damper position during each said interval.

29. The air recirculator of claim 27 wherein said processor means further includes a programmable scheme for altering said different damper adjustments during each said interval.

30. In a fabric dryer system having a drying chamber, a method for controlling the amount of fresh air entrained into the system, and the amount of air exhausted from the system during a drying cycle, comprising the steps of:
monitoring a heat cycle timer for an indication of a heat cycle;
in response to said indication automatically adjusting the amount of fresh air entrained and the amount of air exhausted;
monitoring an indication of a first predetermined temperature level of the air removed from said drying chamber;
in response to said indication of said first temperature level, automatically adjusting the amount of fresh air entrained and the amount of air exhausted;
monitoring an indication of a second predetermined temperature level of air removed from said chamber;
in response to said second predetermined temperature indication automatically adjusting the amount of fresh air entrained and the amount of air exhausted;
monitoring the outside temperature of said fresh air external to said dryer system; and
in response to a predetermined temperature indication of said fresh air, automatically adjusting the amount of fresh air entrained and the amount of air exhausted whereby the efficiency of the fabric dryer system is optimized.

31. The method of controlling the dryer system of claim 30 wherein the step of monitoring the outside temperature further comprises monitoring the temperature of the fresh air outside said drying system.

32. In a dryer system of the type having a dryer chamber, a dryer thermostat, means for recirculating at least a portion of the hot air removed from said chamber, a fresh air damper, and an exhaust damper, an automatic damper control system comprising:
motor means for moving at least one of said exhaust damper and said fresh air damper;
a processor;
a plurality of indicator inputs connected between said dryer thermostat and said processor, each indicator input indicating a temperature level of said hot air removed from said drying chamber;
a fresh air thermostat for measuring the temperature of the fresh air, said thermostat including an input to said processor;
a voltage divider with a plurality of voltage taps, each said tap being connectable to said several motor means;
a plurality of relays controlled by said processor, each relay being associated with a different one of said voltage taps for connecting a voltage to said several motor means;
a software program routine for controlling said processor during a drying cycle to operate a first one of said relays in response to said heat cycle timer, to operate a second one of said relays in response to a predetermined temperature measured by said fresh air thermostat and to operate additional ones of said relays in response to the plurality of indicator inputs to thereby cause said motor means to adjust said dampers during the drying cycle whereby the efficiency of the system is optimized.

33. In a fabric drying system having a heat source providing hot air and controlled by a temperature sensing means with outputs indicating discrete temperature levels, a method of controlling the mixture of fresh air and reused air recirculated during a fabric drying cycle, comprising steps of:
monitoring said temperature sensing means output;
monitoring an electrical indication of the presence of a drying cycle,
circulating maximum fresh air for a short interval of time upon electrical indication of the presence of a drying cycle irrespective of said temperature levels;
processing both said temperature sensing means outputs and said electrical indication of the presence of a drying cycle with a processor means; and
automatically adjusting the proportions of fresh air mixed with reused air in accordance with a predetermined scheme to avoid build up of a positive mixed air pressure in said system.

34. A method of controlling the mixture and flow of fresh air and reused air in a heat recovery and reuse drying system having a mixing chamber for mixing fresh air with hot air, the hot air being heated by a source of heat in said system, and further having temperature sensor means with outputs, comprising the steps of:
monitoring said temperature sensor outputs;
monitoring an electrical indication of the presence of air movement;
processing said temperature sensor outputs and said indication of the presence of air movement with a processor means; and
automatically adjusting the proportions of fresh air mixed with reused air in accordance with a predetermined scheme based on an anticipated rise in temperature in said recirculated air to achieve a predetermined temperature preventing build up of a positive pressure of the mixed air in said system.

35. In a fabric drying system having a heat source providing hot air and controlled by temperature sensor means with outputs indicating discrete temperature levels, a method of controlling the mixture and flow of fresh air and reused air recirculated during a fabric drying cycle, comprising the steps of:
monitoring said temperature sensor outputs;
monitoring an electrical indication of the presence of a drying cycle;
processing said temperature sensor outputs and said electrical indication of the presence of a drying cycle with processor means; and
automatically adjusting the proportions of fresh air mixed with reused air in accordance with a predetermined scheme based on an anticipated rise in temperature in said recirculated air to achieve a predetermined temperature and to prevent build up of a positive air pressure in at least a portion of said system.

* * * * *

UNITED STATES PATENT AND TRADEMARK OFFICE
CERTIFICATE OF CORRECTION

PATENT NO. : 4,549,362

DATED : October 29, 1985

INVENTOR(S) : John C. Haried

It is certified that error appears in the above-identified patent and that said Letters Patent is hereby corrected as shown below:

In column 1, line 67, please delete "within" and substitute therefor --with--; and delete "prefereably" and substitute therefor --preferably--.

In column 2, line 36, please delete "cycler" and substitute therefor --cycle--.

In column 3, line 27, before "program" please insert --a--.

In column 3, line 43, before "use" please delete "to" and substitute therefor --for--.

In column 4, line 9, before "mixer" please insert --air--.

In column 5, line 21, please delete "matress" and substitute therefor --mattress--.

UNITED STATES PATENT AND TRADEMARK OFFICE
CERTIFICATE OF CORRECTION

PATENT NO. : 4,549,362

DATED : October 29, 1985

INVENTOR(S) : John C. Haried

It is certified that error appears in the above-identified patent and that said Letters Patent is hereby corrected as shown below:

In column 5, line 44, before "59" please insert --arm--.

In column 5, line 51, please delete "extend" and substitute therefor --extent--.

In column 5, line 62, please delete "dampers" and substitute therefor --damper--.

In column 6, line 43, please delete "6" and substitute therefor --36--.

In column 7, line 42, please delete "time" and substitute therefor --timer--.

In column 9, line 14, please delete "perfroms" and substitute therefor --performs--.

In column 9, line 32, please delete "temperatures" and substitute therefor --temperature--.

In column 11, lines 54 and 55, please delete "termperature" and substitute therefor --temperatures--.

In column 13, line 9, please delete "temination" and substitute therefor --termination--.

In column 16, line 49, please delete "programmed" and substitute therefor --programmable--.

UNITED STATES PATENT AND TRADEMARK OFFICE
CERTIFICATE OF CORRECTION

PATENT NO. : 4,549,362

DATED : October 29, 1985

INVENTOR(S) : John C. Haried

It is certified that error appears in the above-identified patent and that said Letters Patent is hereby corrected as shown below:

In column 20, line 11, please delete "256" and substitute therefor --258--.

In column 21, line 67, please delete "thann" and substitute therefor --than--.

In column 23, line 38, please delete "ac" and substitute therefor --AC--.

In column 23, lines 58 and 59, please delete "of that exhausted into the system, such air being in excess".

In column 24, line 15, please delete "maintianing" and substitute therefor --maintaining--.

Col. 25, lines 15-16, delete "position" and substitute therefor --positions--.

Col. 28, line 31, delete "connect" and substitute therefor --connected--.

UNITED STATES PATENT AND TRADEMARK OFFICE
CERTIFICATE OF CORRECTION

PATENT NO.  : 4,549,362
DATED       : October 29, 1985
INVENTOR(S) : John C. Haried It is certified that error appears in the above-identified patent and that said Letters Patent is hereby corrected as shown below:

Col. 30, claim 33, line 20, after "cycle" delete "," and
   substitute therefor --;--.

Signed and Sealed this

Thirtieth Day of March, 1993

Attest:

STEPHEN G. KUNIN

*Attesting Officer*     *Acting Commissioner of Patents and Trademarks*